United States Patent
Hosouchi et al.

(10) Patent No.: US 7,162,580 B2
(45) Date of Patent: Jan. 9, 2007

(54) REMOTE COPY CONTROL METHOD

(75) Inventors: Masaakii Hosouchi, Zama (JP);
Keiichi Sakata, Yokohama (JP);
Hideaki Abe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 10/811,923

(22) Filed: Mar. 30, 2004

(65) Prior Publication Data
US 2005/0132156 A1    Jun. 16, 2005

(30) Foreign Application Priority Data
Dec. 16, 2003   (JP) .............................. 2003-417863

(51) Int. Cl.
*G06F 12/00* (2006.01)
(52) U.S. Cl. ........................ 711/114; 711/161; 711/162; 711/165
(58) Field of Classification Search ..................... None
See application file for complete search history.

(56) References Cited

U.S. PATENT DOCUMENTS

| | | | |
|---|---|---|---|
| 6,173,377 B1 * | 1/2001 | Yanai et al. ................ | 711/162 |
| 6,230,200 B1 | 5/2001 | Forecast et al. | |
| 6,574,667 B1 | 6/2003 | Blumenau et al. | |
| 2002/0178328 A1 * | 11/2002 | Honda et al. ............... | 711/114 |
| 2004/0004966 A1 * | 1/2004 | Foster et al. ............... | 370/399 |
| 2004/0081096 A1 * | 4/2004 | Martin ....................... | 370/231 |
| 2004/0225697 A1 | 11/2004 | Asano et al. | |
| 2004/0254964 A1 | 12/2004 | Kodama et al. | |

FOREIGN PATENT DOCUMENTS

| | | |
|---|---|---|
| JP | 8-328760 | 12/1996 |
| JP | 2002-542526 | 12/2002 |
| JP | 2003-122509 | 4/2003 |

OTHER PUBLICATIONS

Symmetrix SRDF Host Component for OS/390 and z/OS Version 5.1.0, Product Guide P/N 300-00-163 REV A02.

* cited by examiner

*Primary Examiner*—Reginald Bragdon
*Assistant Examiner*—Thanh D. Vo
(74) *Attorney, Agent, or Firm*—Mattingly, Stanger, Malur & Brundidge, P.C.

(57) ABSTRACT

A method for remotely copying volumes is disclosed. An identifier of a first disk subsystem of a first volume is obtained from a volume pair list. The first volume is a copy source or a copy destination of a volume pair. Route information including the identifier of the first disk subsystem is searched from a route list, which includes route information for determining an identifier of a second disk subsystem that relays a transmitting route of a command to the first disk subsystem and for determining an identifier of a third disk subsystem connected to a host computer. The identifier of the third disk subsystem indicated by the route information is obtained. A remote copy command of the first volume is issued to the third disk subsystem corresponding to the obtained identifier.

20 Claims, 23 Drawing Sheets

FIG. 3A

```
┌─ 120a
│ <PairList>
│ <ID>PairAB</ID>
│ <Pair><prim seq#=DA, dev#=VA1><sec seq#=DB, dev#=VB1></Pair>
│ <Pair><prim seq#=DA, dev#=VA2><sec seq#=DB, dev#=VB2></Pair>
│ </PairList>
```

FIG. 3B

```
┌─ 120b
│ <PairList>
│ <ID>PairBC</ID>
│ <Pair><prim seq#=DB, dev#=VB1><sec seq#=DC, dev#=VC1></Pair>
│ <Pair><prim seq#=DB, dev#=VB2><sec seq#=DC, dev#=VC2></Pair>
│ </PairList>
```

FIG. 3C

```
┌─ 120c
│ <PairList>
│ <ID>PairAC</ID>
│ <Pair><prim seq#=DA, dev#=VA1><sec seq#=DC, dev#=VC1></Pair>
│ <Pair><prim seq#=DA, dev#=VA2><sec seq#=DC, dev#=VC2></Pair>
│ </PairList>
```

F I G. 5

─130

```
<HostPathList>
<ID>3DC</ID>
<path><host=HA, DKC=DA></path>
<path><host=HC, DKC=DC></path>
</HostPathList>
```

FIG. 8

```
┌─140
<DKCPathList>
<ID>3DC</ID>
<path><DKC=DA, DKC=DB></path>
<path><DKC=DB, DKC=DC></path>
<path><DKC=DA, DKC=DC></path>
</DKCPathList>
```

| priority | host | route |
|---|---|---|
| 1 | HA | DA-DB-DC |
| 1 | HA | DA-DB |
| 1 | HA | DA |
| 2 | HA | DA-DC-DB |
| 2 | HA | DA-DC |
| 1 | HC | DC-DB-DA |
| 1 | HC | DC-DB |
| 1 | HC | DC |
| 2 | HC | DC-DB-DA |
| 2 | HC | DC-DB |

FIG. 12

```
┌─170
│ LOADPAIR ID(PairAB)
│ LOADROUTE ID(3DC) HOST(HA)
│ ESTABLISH ID(PairAB)
```

F I G. 15 A
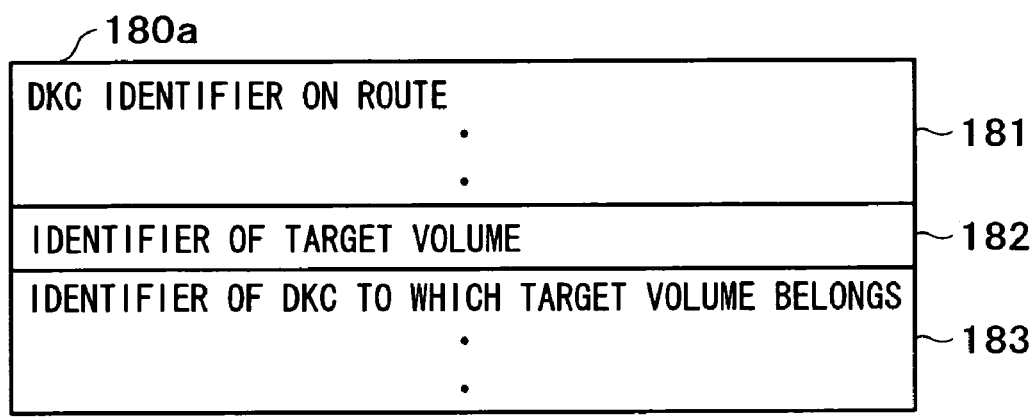
F I G. 15 B
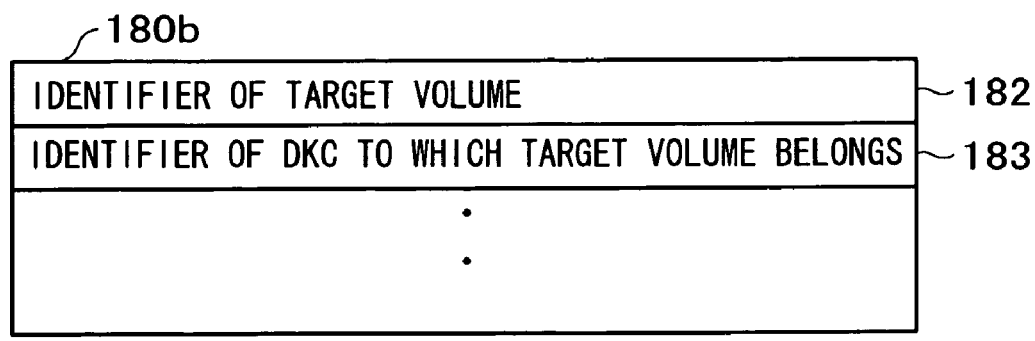

FIG. 18

150b ROUTE LIST

```
<RouteList>
<ID>3DC</ID>
<route host=HA priority=1>
   <DKC hop=1, seq#=DA>
   <DKC hop=2, seq#=DB>
   <DKC hop=3, seq#=DC>
</route>
<route host=HC priority=1>
   <DKC hop=1, seq#=DC>
   <DKC hop=2, seq#=DB>
   <DKC hop=3, seq#=DA>
</route>
<route host=HA priority=2>
   <DKC hop=1, seq#=DA>
   <DKC hop=2, seq#=DC>
   <DKC hop=3, seq#=DB>
</route>
<route host=HC priority=2>
   <DKC hop=1, seq#=DC>
   <DKC hop=2, seq#=DA>
   <DKC hop=3, seq#=DB>
</route>
</RouteList>
```

REMOTE COPY CONTROL METHOD

BACKGROUND OF THE INVENTION

1. Field of the Invention

The present invention relates to a remote copy control method, and more particularly, to a remote copy function which duplicates data between disk subsystems not via a host computer. Further particularly, the present invention relates to a definition and control method for a command transmitting route of a disk controller (DKC) without a direct path from the host computer in the remote copy between the disk controllers arranged on three or more sites.

2. Description of the Prior Arts

A remote copy technology is known to hold the copy of a volume of a disk subsystem in a disk controller which is remotely arranged and to synchronously or asynchronously transmit updated data, for the purpose of saving, from any accidents, data stored in the volume.

For example, Japanese Unexamined Patent Publication No. 2003-122509 and Indication of Existence of Patent No. 2002-542526 disclose a method for maintaining the data copy by cascade-connecting three disk controllers in order to reduce the risk upon accidents and to suppress the bandwidth necessary for a network. The disk controllers do not necessarily have the host computer and, it is advantageous in term of the reliability to execute the remote copy or state acquisition via a communication line between the disk controllers, as compared with such a case via the host computer having a possibility of a network default and a host computer default. Consequently, according to a multi-hop method disclosed in Japanese Unexamined Patent Publication No. 2003-122509 and Indication of Existence of Patent No. 2002-542526, the updated data is transmitted from the host computer via the communication line between the disk controllers.

Further, according to the abovementioned related arts, in order to issue a remote command for remote copy control serving as a command for the disk controller describing remote copy operation contents for a volume pair, which is transmitted from the host computer via another disk controller, it is necessary to describe a multi-hop list serving as a route to an operand of a host command. Therefore, in the case of changing the connection structure between the disk controllers or between the disk controller and the host computer, all the files describing the host command need to be changed. Further, in the case of describing the processing for executing the command from a remote site for recovery, it is necessary to obtain a route from the host computer on the recovery site and describe the multi-hop list. When the command can be inputted from a plurality of routes, the command is inputted via another route after causing a link default by describing the host command describing the other route.

SUMMARY OF THE INVENTION

Accordingly, it is one object of the present invention to automatically define and control a transmitting route of a remote command for remote copy control.

Further, it is another object of the present invention to reduce the troublesomeness when a user describes or rewrites a host command or a script.

According to the present invention, a remote copy control method for remotely copying a plurality of volumes formed in a plurality of disk subsystems, comprises the steps of:

obtaining an identifier of a first disk subsystem of a first volume as a copy source or a copy destination of a volume pair as a remote copy target in the disk subsystems, for a host computer connected to at least one of the disk subsystems, based on a volume pair list for registering an identifier of the first volume and an identifier of the first disk subsystem of the first volume;

searching route information including the identifier of the first disk subsystem based on a route list including the route information for registering an identifier of a plurality of second disk subsystems for relay as a command transmitting route for the first disk subsystem and information for determining an identifier of a third disk subsystem connected to the host computer among the second disk subsystems, and obtaining an identifier of the third disk subsystem expressed by the searched route information; and issuing, to the third disk subsystem corresponding to the obtained identifier, a remote copy command of the first volume including, in input information, the identifier of the second disk subsystem and the identifier of the first disk subsystem.

Further, according to the present invention, a disk subsystem having a plurality of disk subsystems having volumes for storing data used for a host computer, for processing a command transmitted from the host computer and for remotely copying the volumes by connecting the disk subsystems, comprises:

a memory for storing a volume pair list and a route list, the volume pair list for holding an identifier of a first volume as a copy source or a copy destination of remote copy and an identifier of a first disk subsystem of the first volume, and the route list for holding route information including information for determining an identifier of the host computer, the identifier of the first disk subsystem, an identifier of a second disk subsystem for relay as a transmitting route of the command to the first disk subsystem from the host computer, or an identifier of a third disk subsystem connected to the host computer among the second disk subsystems;

means for obtaining the identifier of the first disk subsystem including the first volume by referring to the volume pair list;

means for searching the route information including the first disk subsystem by referring to the route list and for obtaining the identifier of the third disk subsystem included in the route information; and means for requesting the remote copy of the first volume in the first disk subsystem to the third disk subsystem relating to the obtained identifier.

Preferably, the host computer has the memory and a processing unit, and the memory further stores a program for realizing obtaining of the identifiers and executes the program by the processing unit so as to realize the obtaining means.

BRIEF DESCRIPTION OF THE DRAWINGS

FIGS. 3A to 3C are diagrams showing examples of a volume pair list 120 according to the first embodiment;

FIG. 5 is a diagram showing one example of a host path list 130 according to the first embodiment;

FIG. 8 is a diagram showing one example of a disk controller (DKC) path list 140 according to the first embodiment;

FIG. 10 is a diagram showing one example of a route list 150 according to the first embodiment;

FIG. 12 is a diagram showing one example of a script according to the first embodiment;

FIGS. 15A and 15B are diagrams showing the structure of input information on a command for remote copy control (DKC command) according to the first embodiment;

FIG. 18 is a diagram showing one example of a route list 150b according to the second embodiment;

DETAILED DESCRIPTION OF THE PREFERRED EMBODIMENTS

Hereinbelow, embodiments of the present invention will be described in detail.

Figure 1:
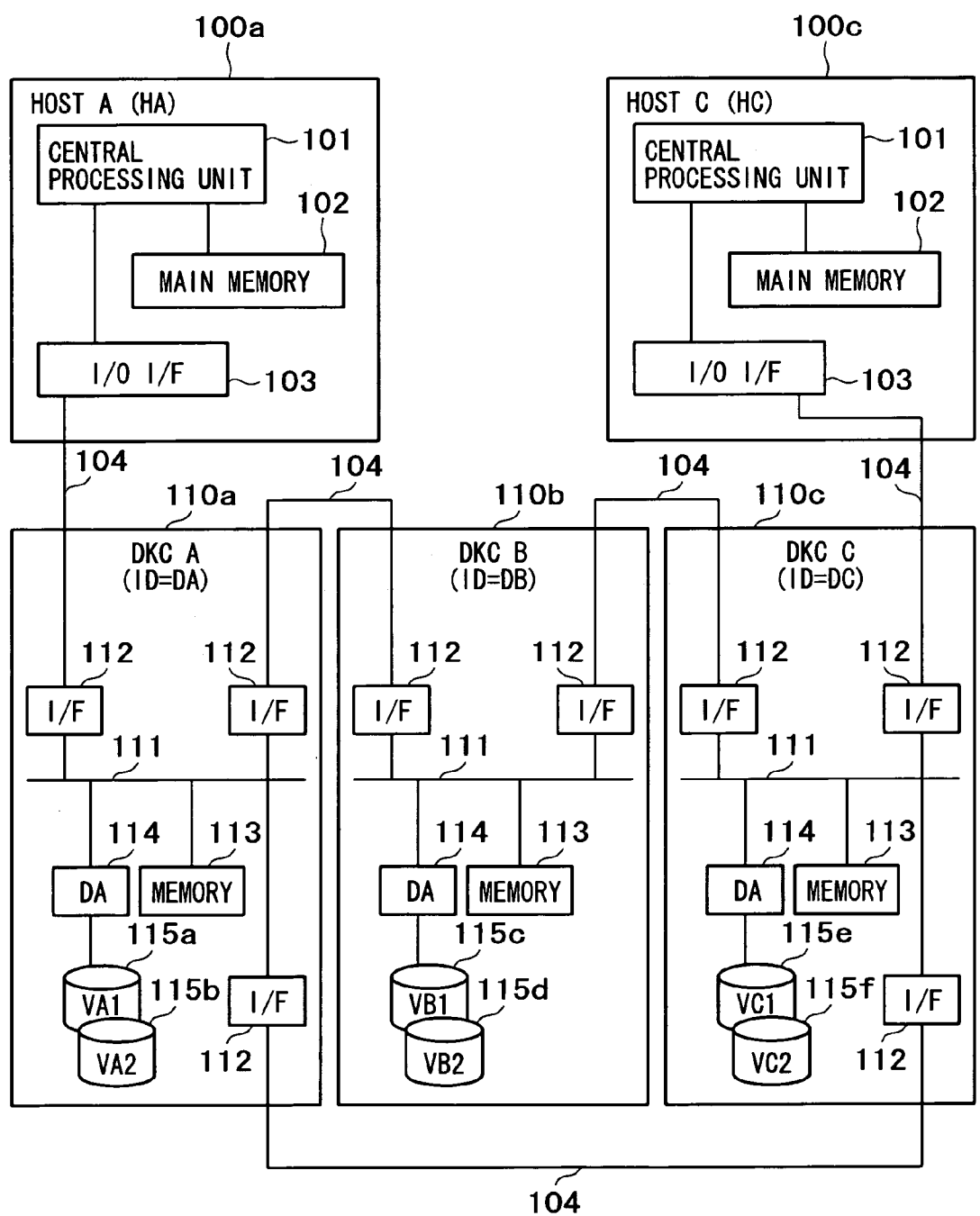
FIG. 1 is a block diagram showing the hardware structure of a disk subsystem according to the first embodiment of the present invention.

FIG. 1 is a block diagram showing one example of the hardware structure of a disk subsystem according to the first embodiment of the present invention.

Referring to FIG. 1, a first host computer 100a and a second host computer 100c have a central processing unit (CPU) 101, a main memory 102, an input/output interface (hereinafter, referred to as an I/O I/F) 103 such as a channel, respectively, and further are connected to a disk controller (hereinafter, referred to as a DKC) 110 via a network 104 such as a communication line.

A first DKC 110a, a second DKC 110b, and a third DKC 110c comprise: one or a plurality of interfaces 112 such as channel adapters; a shared memory 113; and one or a plurality of disk adapters 114, respectively, and are further connected by a switch (not shown) or an inner bus 111. One or a plurality of disk devices are connected to the disk adapter 114. Volumes 115 (115a to 115f) serving as logical or physical storage areas are assigned to the disk device.

The first host computer 100a is connected to the first DKC 110a and the second host computer 100c is connected to the third DKC 110c. The first to third DKCs 110a to 110c are connected to each other via the network 104. Although not shown, the host computers 100a and 100c comprise a terminal device having an input device such as a key or mouse and a display device having a GUI screen. The first and second host computers 100a and 100c comprise an external storage and store various lists and programs, which will be described later.

The number of host computer 100 may be at least one and, for example, the second host computer 100c may not exist. Further, a third host computer 100 may be used. Hereinafter, the first host computer 100a and second host computer 100c are simply referred to as a host computer 100 if necessary. Similarly, the first to third DKCs 110a and 110c are referred to as DKC 110 if necessary. The DKC 110 may include at least one pair of DKCs which are mutually connected. For example, the third DKC 110c may not exist, and the first DKC 110a and the third DKC 110c may not be connected. Further, another DKC (not shown) may exist.

Figure 2:
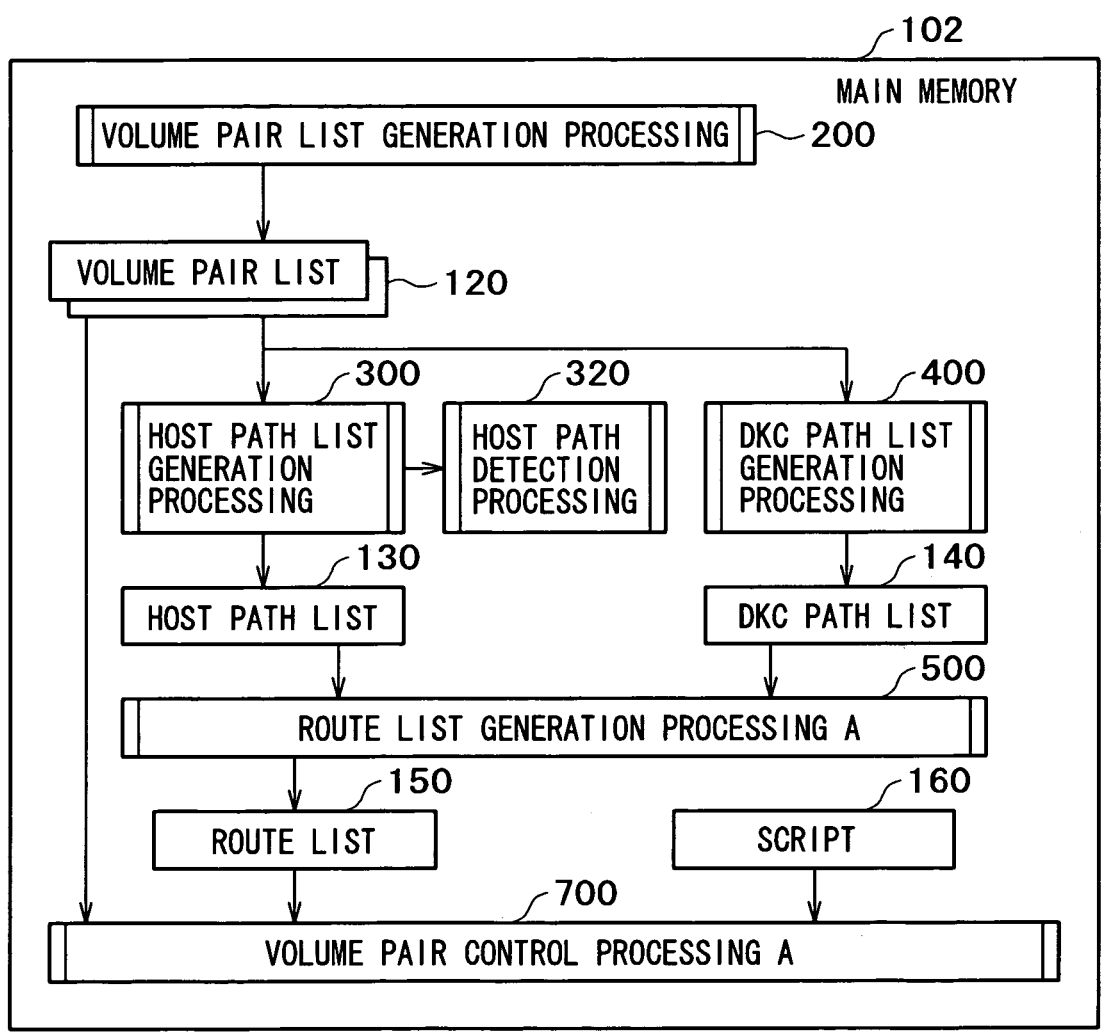
FIG. 2 is a diagram showing the entire processing functions for controlling a volume pair according to the first embodiment.

FIG. 2 is a diagram showing the entire processing functions for controlling the volume pair in a disk subsystem.

The main memory 102 in the first and second host computers 10a and 100c store in a table format: a volume pair list 120 which defines the pair of the volume 115 in the same DKCs 110 or different DKCs 110; a host path list 130 which defines whether or not a command path exists between the host computer 100 and the DKC 110; a DKC path list 140 which defines whether or not the command path exists between the different DKCs 110; a route list 150 which defines a route for the command path from the host computer 100 to the DKC 110; and a script 160 which describes a host command for requesting remote copy processing between the volumes 115.

Further, the main memory 102 stores programs which execute: volume pair list generation processing 200 which forms the volume pair list 120; host path list generation processing 300 which forms the host path list 130; host path detection processing 320 which checks whether or not the command path exists between the host computer 100 and the DKC 110; DKC path list generation processing 400 which forms the DKC path list 140; route generation processing 500 which forms the route list 150; and volume pair control processing 700 which requests the remote copy processing between the volumes described in the volume pair list 120 in accordance with the description contents of the script 160 via the DKC 110 described in the route in the route list 150. These programs are properly transmitted and executed by the CPU 101.

Usually, these lists and programs are stored as files in an external storage (not shown), and are loaded to and executed by the main memory 102 if necessary.

Herein, the command path is a logical path in the network 104 which can transmit the request (DKC command) for the DKC 110 or the volumes 115 in the DKC 110 between the host computer 100 and the DKC 110 or between the DKCs 110. For example, the command path is a logical path between the disk adapter 114 connected to the disk device of the volume 115 for receiving the DKC command representatively in the DKCs 110 and the disk adapter 114 in another DKC 110 or interface 103 in the host computer 100. Among the logical paths between the disk adapters 114 formed to transmit the data in the volume pair, the command path is a set of logical paths in which the DKC 110 on the transmission side is equal to the DKC 110 on the receiving side.

The lists 120 to 150 and script 160 do not need to exist on the main memory 102 and may exist upon executing the relating programs. For example, when the route list generation processing 500 completes, the volume pair list 120 and the route list 150 necessary for the volume pair control processing 700 are stored in the file in the main memory 102, then are erased from the main memory 102, and may be held together with the additionally-generated script 160 in the file of the volume 115 until executing the volume pair control processing 700.

FIGS. 3A to 3C are diagrams showing examples of the volume pair list 120 shown in FIG. 2.

Referring to FIG. 3A, a volume pair list 120a is a volume pair list between the volume in the first DKC 110a and the volume in the second DKC 110b. The volume pair list 120a includes: an identifier "Pair AB" for identifying the volume pair list 120; one pair definition indicating that the volume 115a and the volume 15c are one pair; and another pair definition indicating that the volume 115b and the volume 115d are one pair. In the volume pair definition, identifier so the volumes in both the first and second DKCs 110a and 110b, e.g., a device number (VA1 in the case of the volume 115a) is sequentially described to data "dev#=" and the identifier of the DKC 110 of the volume 115, e.g., a serial number of the DKC 110 (DA in the case of the first DKC 110a) is sequentially described to data "seq=".

Referring to FIGS. 3B and 3C, a volume pair list 120b includes the volume pair definitions between the volumes 115c and 115d in the second DKC 110b and the volumes 115e and 115f in the third DKC 110c. A volume pair list 120c includes the volume pair definitions between the volumes 115a and 115b in the first DKC 110a and the volumes 115e and 115f in the third DKC 110c. Here, in the volume pairs, the volume 115a (or 115b) as the copy source and the volume 115e (or 115f) as the copy destination are called a primary volume and a secondary volume, respectively. Further, in the volume pairs, the definition of the primary volume and the definition of the secondary volume are called a primary definition and a secondary definition, respectively.

In the volume pair lists 120a to 120c, both the volumes in the volume pair necessarily do not have the volumes in the same DKC 110. For example, the single volume pair list may include the volume pair definition for the two DKCs having the same serial number "seq" in the primary volume "prim" and the different serial numbers "seq" in the secondary volume "sec". The volume pair lists 120a to 120c may be described in one volume pair list by simultaneously performing the same operations such as the establishment, synchronization, and copy of the volume pair.

The volume pair lists 120a to 120c are not limited to the volume pair lists 120a to 120c shown in FIGS. 3A to 3C if they includes information from which both the volumes 115 of one pair included therein are uniquely identified. For example, the format and the dump format stored in the data array of the main memory 102 may be used as the volume pair list. The volume may include another information such as identification information of the disk adapter 114 connected to the volume 115.

Figure 4:
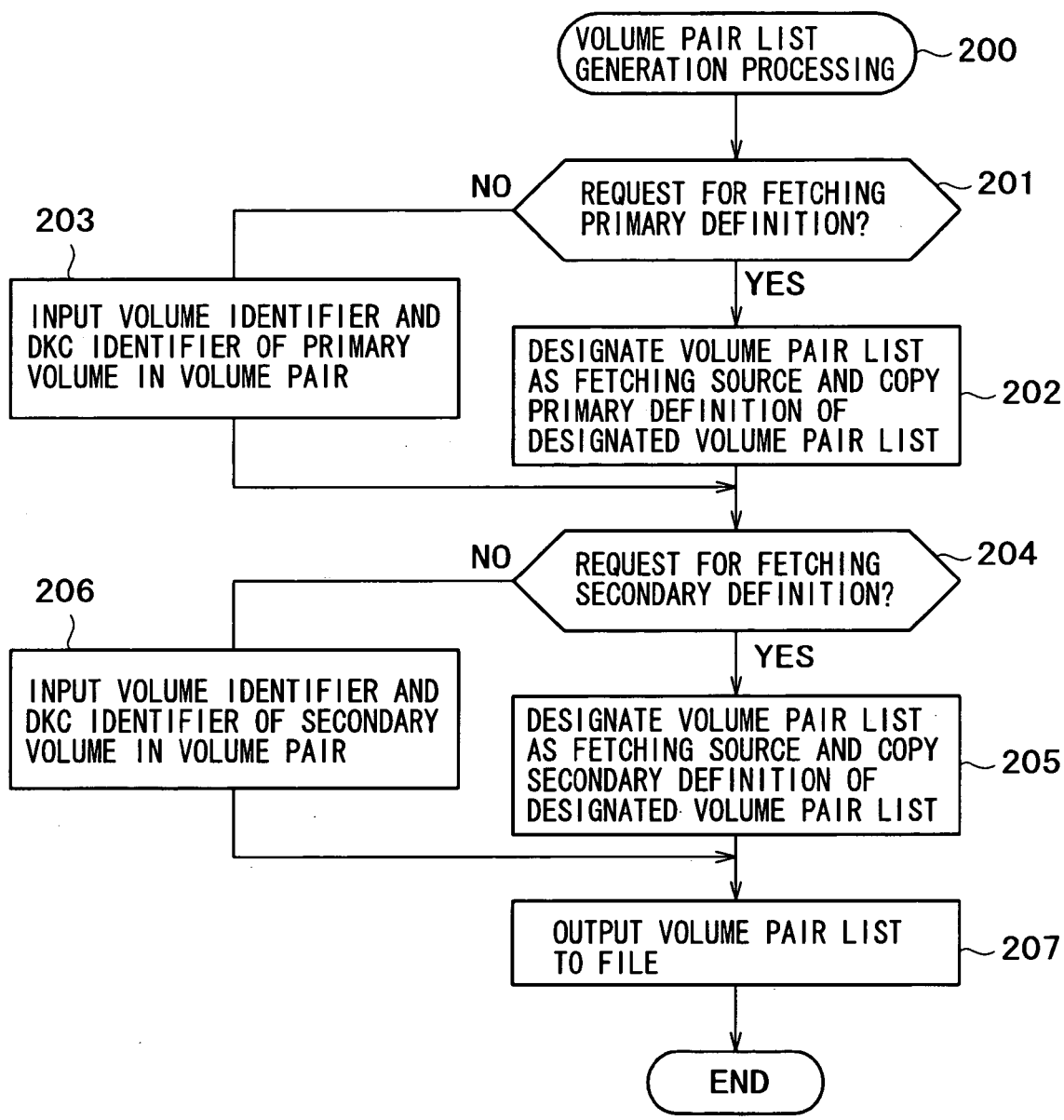
FIG. 4 is a flowchart for volume pair list generation processing 200 according to the first embodiment.

FIG. 4 is a flowchart for volume pair list generation processing 200 of the volume pair list 120 shown in FIG. 2.

First, the volume identifier and DKC identifier of primary volume in volume pair are inputted from a field of a terminal device of the host computer, a command, or a dialogue of the GUI screen (step 203). The number of volumes can be inputted to define a plurality of volumes in a lump. When the key input, menu selection on the GUI screen, or button click operation is performed, an identification name of another volume pair list 120 is inputted and the primary definition of the volume pair definition can be copied from the other volume pair list 120 (steps 201 to 202). For example, upon generating the volume pair list 120c, the identifier "Pair AB" is inputted and the primary definition of the volumes 115a and 115b is copied from the volume pair list 120a. Similarly, in the case of a request for fetching the secondary definition (step 204), the identification name of another volume pair list 120 is inputted and the secondary definition of the other volume pair list 120 is copied (step 205). If the request is not the fetching one, the DKC identifier and the volume identifier of the secondary volume corresponding to the primary definition in the volume pair are inputted (step 206). Finally, the volume pair list is outputted to the file as shown in FIGS. 3A to 3C based on the inputted information (step 207). The file is stored in the volume in the DKC 110 connected to the host computer 100.

FIG. 5 shows an example of the host path list 130 shown in FIG. 2.

The host path list 130 is information for determining the command path exists between the host computer 100 and the DKC 110. The host path list 130 is used for generating the route list 150 so as to identify the DKC 110 in which the DKC command is inputted from the host computer 100 which executes the volume pair control processing 700. The identifier of the host computer 100 is described subsequently to data "host=" between tags "<path>" and "</path>" indicating the path definition and the identifiers of the host computer 100 and the DKC 110 having the command path are subsequently designated to data "DKC". Referring to FIG. 5, a path exists between the first host computer 100a having a host identifier HA and the first DKC 110a, and a path exists between the second host computer 100c having a host identifier HC and the third DKC 110c. The host computer identifiers HA and HC are named for the first and second host computers 100a and 100c by the user, and may be defined by a CPUID or OS collected from the first and second host computers 100a and 100c or an initial setting parameter.

The host path list 130 is not limited to that shown in FIG. 5 and may be any host path list for recognizing the identifier of the DKC 110 and the identifier of the host computer 100 having the command path for the DKC 110.

Figure 6:
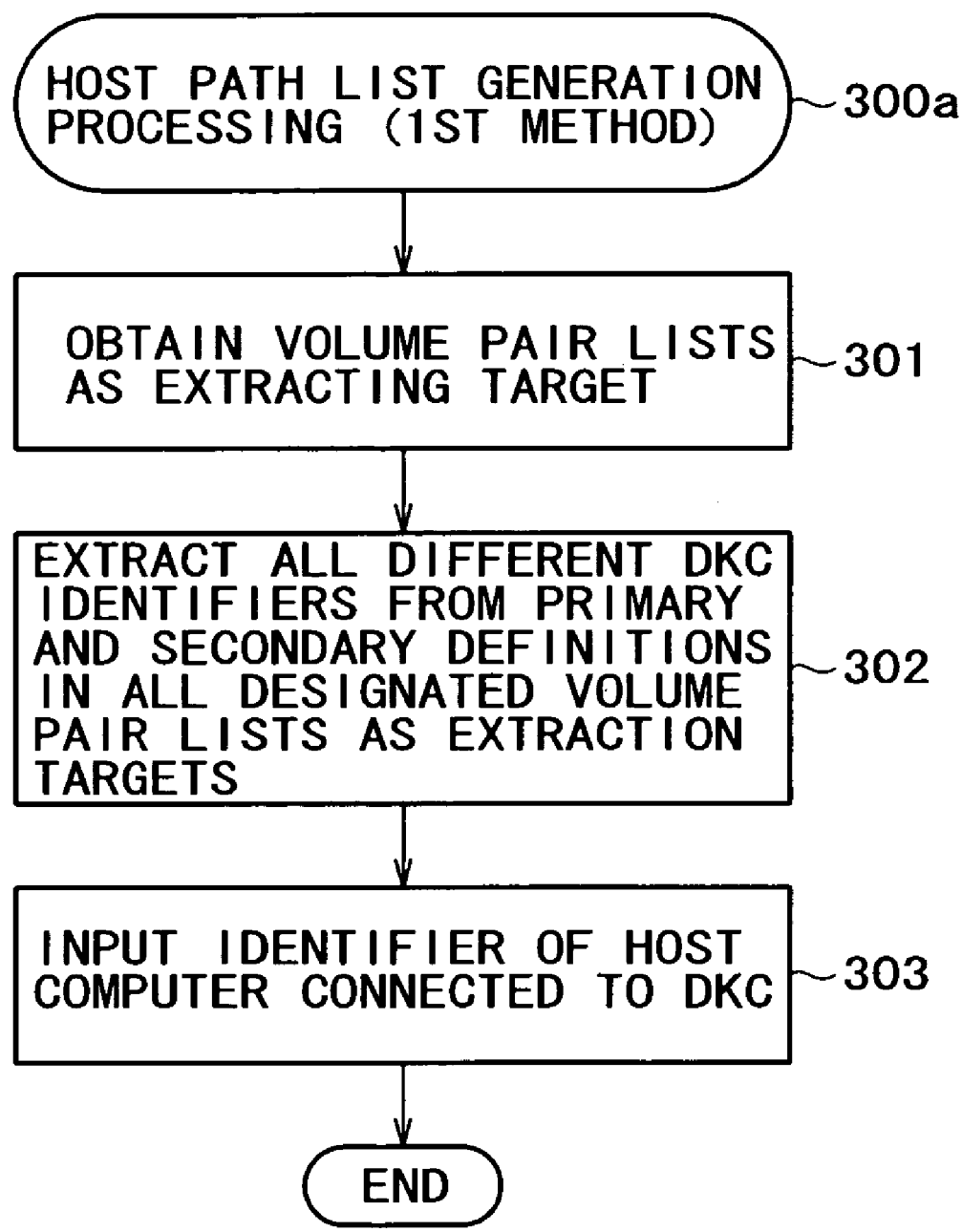
FIG. 6 is a flowchart for host path list generation processing 300 according to the first embodiment.

FIG. 6 shows one example of a flowchart of the host path list generation processing 300a (first method).

First, the volume pair lists 120 as the extracting target are obtained (step 301). The volume pair lists 120 are obtained by loading an ID for identifying the volume pair list 120 (e.g., identifier PairAB in the volume pair list 120a shown in FIG. 3A), by loading the file having the description of the name list of the volume pair lists 120 from the volumes in the DKCs, or by displaying and inputting the ID and name of the volume pair list 120 from the GUI screen of the terminal device of the host computer 100.

Next, all the identifiers of the different DKCs 110 are extracted from the primary definition and the secondary definition of all the volume pair lists 120 (step 302). For example, a word subsequent to "seq#=" is extracted from the three volume pair lists 120a to 120c shown in FIGS. 3A to 3C, the same name is excluded, and three identifiers DA, DB, and DC are extracted. Next, the identifier of the extracted DKC 110 is displayed on the screen of the terminal device and then the identifier of the host computer 100 connected to the DKC 110 is inputted (step 303). The user may generate the host path list 130 by outputting the identifier of the host computer 100 to the file.

Figure 7:
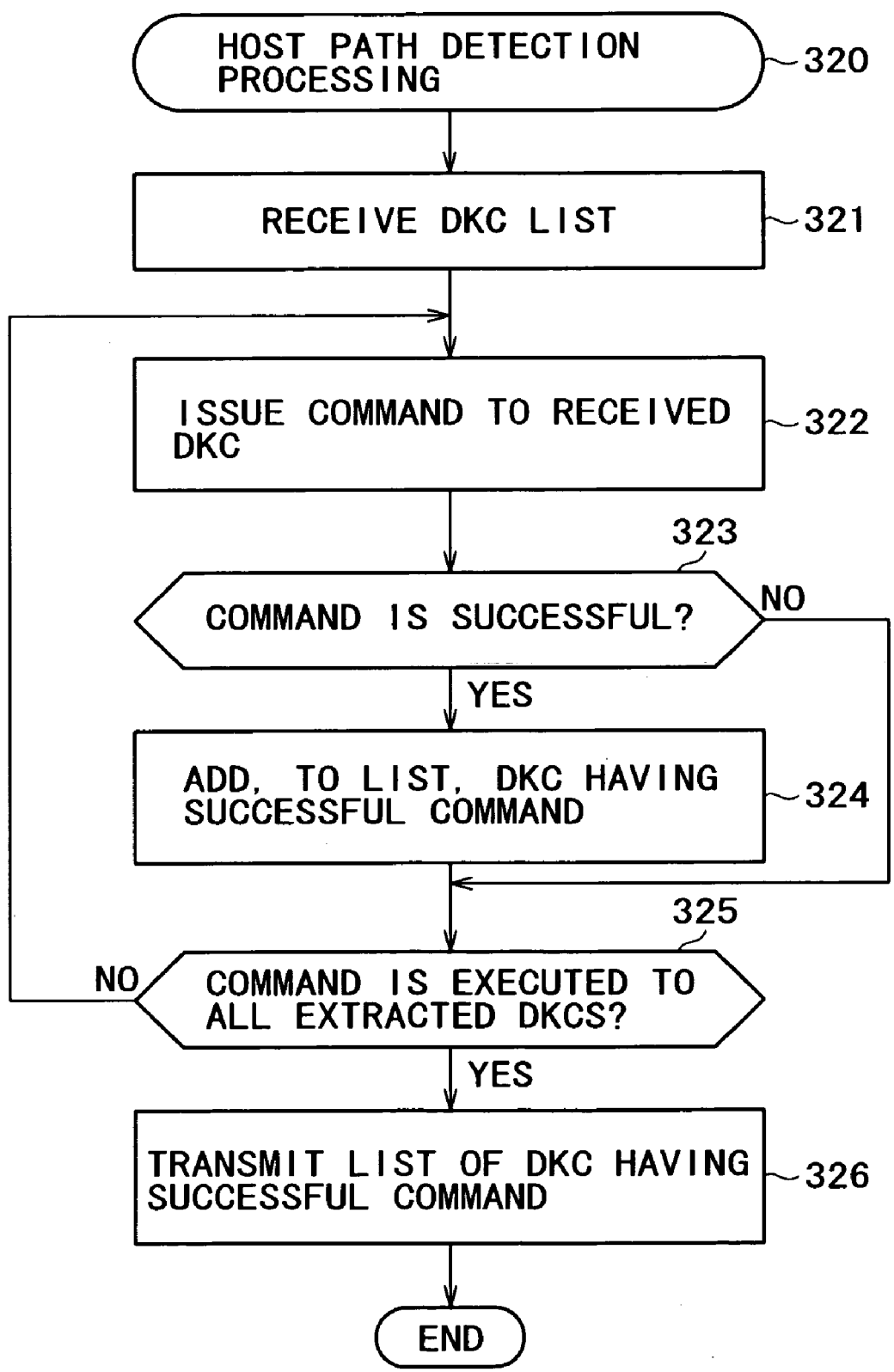
FIG. 7 is a flowchart for host path detection processing 320 according to the first embodiment.

FIG. 7 shows one example of a flowchart of host path detection processing 320.

The list of the DKC 110 is received from host path computer list generation processing 300 (step 321), and then steps 322 to 324 are performed to all the DKCs 110 in the list. That is, a non-remote DKC command which does not influence on the structure or state of the volume and on the DKC 110, such as the acquisition of the DKC information is issued to the DKC 110 (step 322). If the issued command is successful (step 323), the DKC 110 is added to the list of the successful DKC 110 (step 324). The DKC command is executed to all the DKCs 110 (step 325) and then the list of the successful DKCs 110 is transmitted to the host path generation processing 300b (step 326).

FIG. 8 shows one example of the DKC path list 140 shown in FIG. 2.

The DKC path list 140 is information for determining whether or not the command path between the DKCs 110 exists, and is used for generating the route list 150. The identifiers of the DKCs 110 having the command path are subsequently designated to "DKC=" between the tag "<path>" and "</path>" indicating the path definition.

In the example shown in FIG. 8, the command paths exist between the first DKC 110a and the second DKC 110b, the second DKC 110b and the third DKC 110c, and the first DKC 110a and the third DKC 110c.

The DKC path list 140 is not limited to that shown in FIG. 8 and may be any DKC path list for recognizing the list of sets of the identifiers of both the DKCs 110 having the command path.

Figure 9:
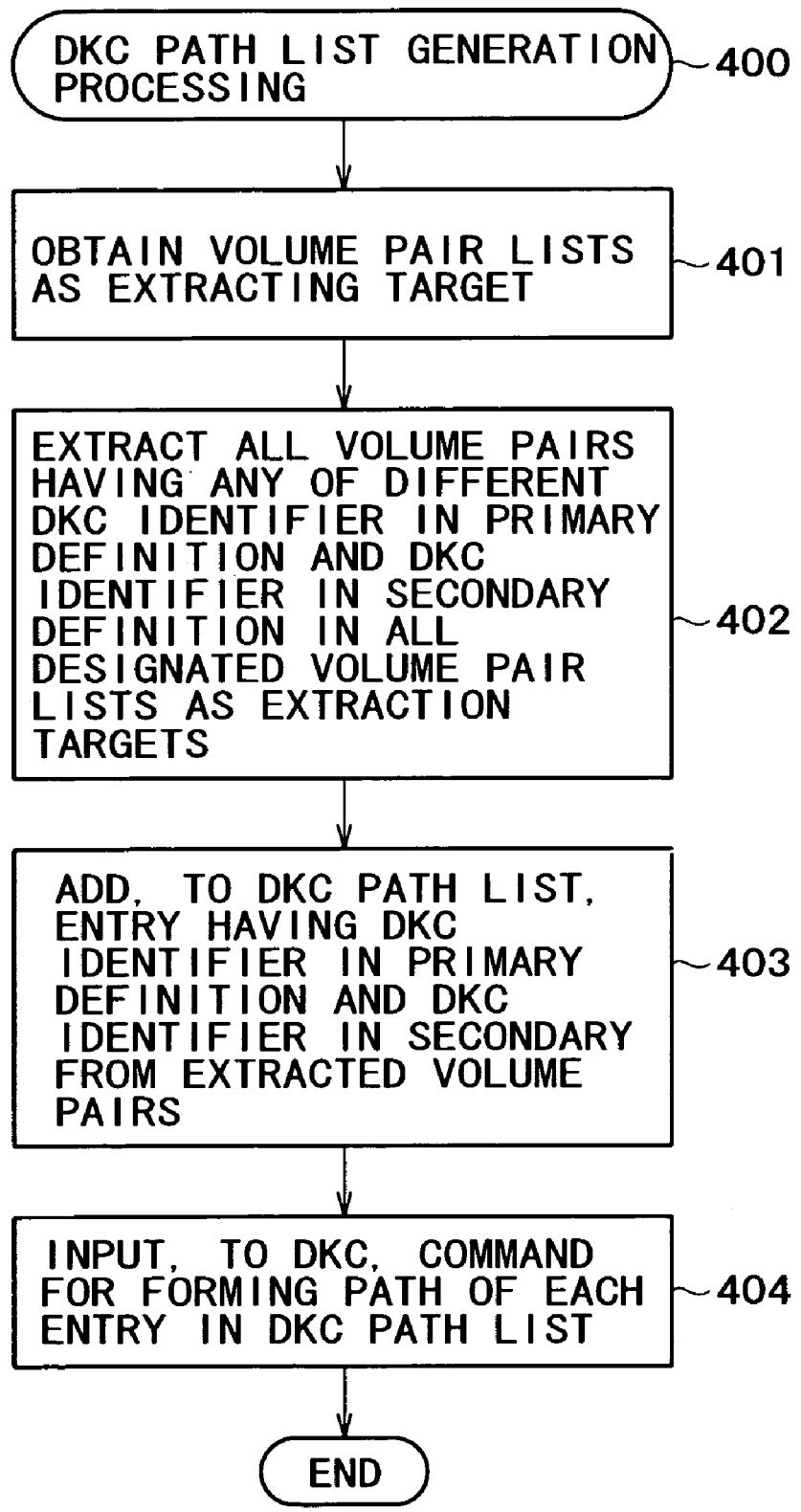
FIG. 9 is a flowchart for DKC path list generation processing 400 according to the first embodiment.

FIG. 9 shows one example of a flowchart of the DKC path list generation processing 400.

Similarly to the host path list generation processing 300, the volume pair list 120 as the target is first obtained (step 401). Next, all the sets of the identifier of the DKC 110 in the primary definition and the identifier of the DKC 110 in the secondary definition different therefrom are extracted from all the volume pair lists 120. For example, three sets of the identifiers DA and DB, DB and DC, and DA and DC are extracted from the volume pair lists 120a to 120c shown in FIGS. 3A to 3C (step 402). Entry having the primary DKC identifier of the extracted pair and the secondary DKC is added to the DKC path list 140 (step 403). Finally, the DKC command for forming the command path between the set of the DKCs 110 in the DKC path list 140 or the logical path between the adapters 114 is inputted to the DKC 110 (step 404).

In steps 402 to 403, in place of extracting the set of the DKCs 110, the set of DKCs 110 having any different one of the DKC identifier and the adapter identifier in the primary definition and the secondary definition may be extracted from the volume pair list 120 including the identifier of the disk adapter 114. In place of step 404, the path may be set by the host command or may be set by the script 160. Further, in place of steps 401 and 402, the DKC command may be transmitted to the DKC 110, the information on the command path which is previously defined to the DKC 110 by the host command may be received to generate the DKC path list 140.

FIG. 10 shows one example 150a of the route list 150 shown in FIG. 2.

The route list 150 is information on the command path route from any desired DKC 110 to the host computer 100. Rows in the route list 150a include the combination of at least the identifier of the host computer 100, the identifier of the DKC 110 having the path from the host computer 100, and the identifier of the DKC 110 having the path from the DKC 110. The number of identifiers indicates an arbitrary number.

For example, when requesting a host route as the first row "HA DA-DB-DC" to the volume 115 in the third DKC 110c at the route end from the first host computer 100a, the DKC command needs to be inputted to the first DKC 110a and the DKC command needs to be transmitted to the third DKC 110c via the second DKC 110b.

Preferably, the route list 150a includes information on the priority of routes. The priority indicates the order for issuing the command to the DKC 110 by the host computer 100. For example, the DKC 110 having a high error rate has the low priority. The priority may be set as an input value by the user, or may be obtained by loading and adding the information such as the error rate.

Figure 11:
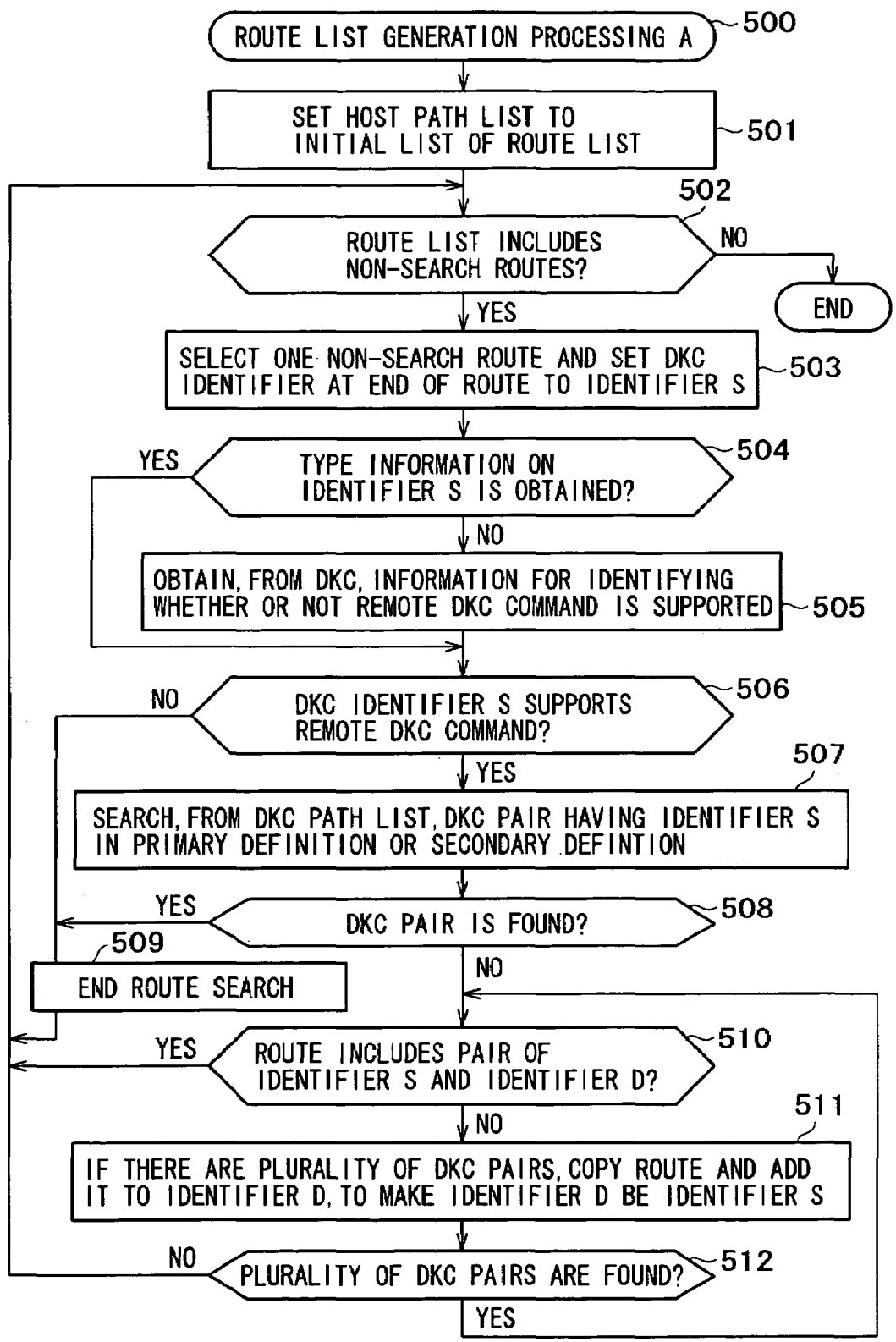
FIG. 11 is a flowchart for route list generation processing 500 according to the first embodiment.

FIG. 11 shows one example of a flowchart of the route list generation processing 500 shown in FIG. 2.

First, the host path list 130 is copied and the host path list 130 is set as an initial list of the route list 150 (step 501). The routes in the route list 150 are searched. As a result, if any non-search route exists, a non-search mark is added. The route list 150 is checked and if the route with the non-search mark exists (step 502), the identifier of the DKC 110 at the route end is selected (step 503). The identifier of the DKC 110 at the end of the selected route is set as an identifier S.

If type information on the identifier S is not obtained (step 504), the DKC command is issued to the end DKC and information is obtained from the end DKC, indicating whether or not the end DKC supports the remote DKC command (step 505). It is checked whether or not the end DKC supports the remote DKC command (step 506), and if NO in step 506, the non-search mark is removed and the route search ends (step 509).

The next processing is performed to search, from the DKC path list 140, the DKC pair which the identifier S of the end DKC matches that of any of the pairs of DKCs 110 in the entry (step 507). It is checked whether or not the DKC pair is found (step 508). If NO in step 508, the non-search mark is removed and the route search ends (step 509). As a search result, when the DKC pair is found (YES in step 509), it is checked whether or not the route includes the DKC having the identifier D of the DKC 110 as the pair of the identifier S of the end DKC included in the DKC pair (step 510). If the route does not include the DKC having the identifier D of the DKC as the pair of the identifier S of the end DKC, the route before adding is copied if second and subsequent and then the identifier D of the DKC 110 is added to the route (step 511). If a plurality of the DKC pairs are found, steps 510 to 511 are repeated until processing all the DKC pairs (step 512).

If the identifier D is not added (step 511), the non-search mark is removed (step 509). After repeating steps 503 to 513 until the route with the non-search mark does not exist, the route is converted into the form of the route list 150b shown in FIG. 18. Upon converting the route into the form of the list 150a, a sub-set of routes is generated to the routes.

FIG. 12 shows one example of the script 160 shown in FIG. 2.

Figure 21:
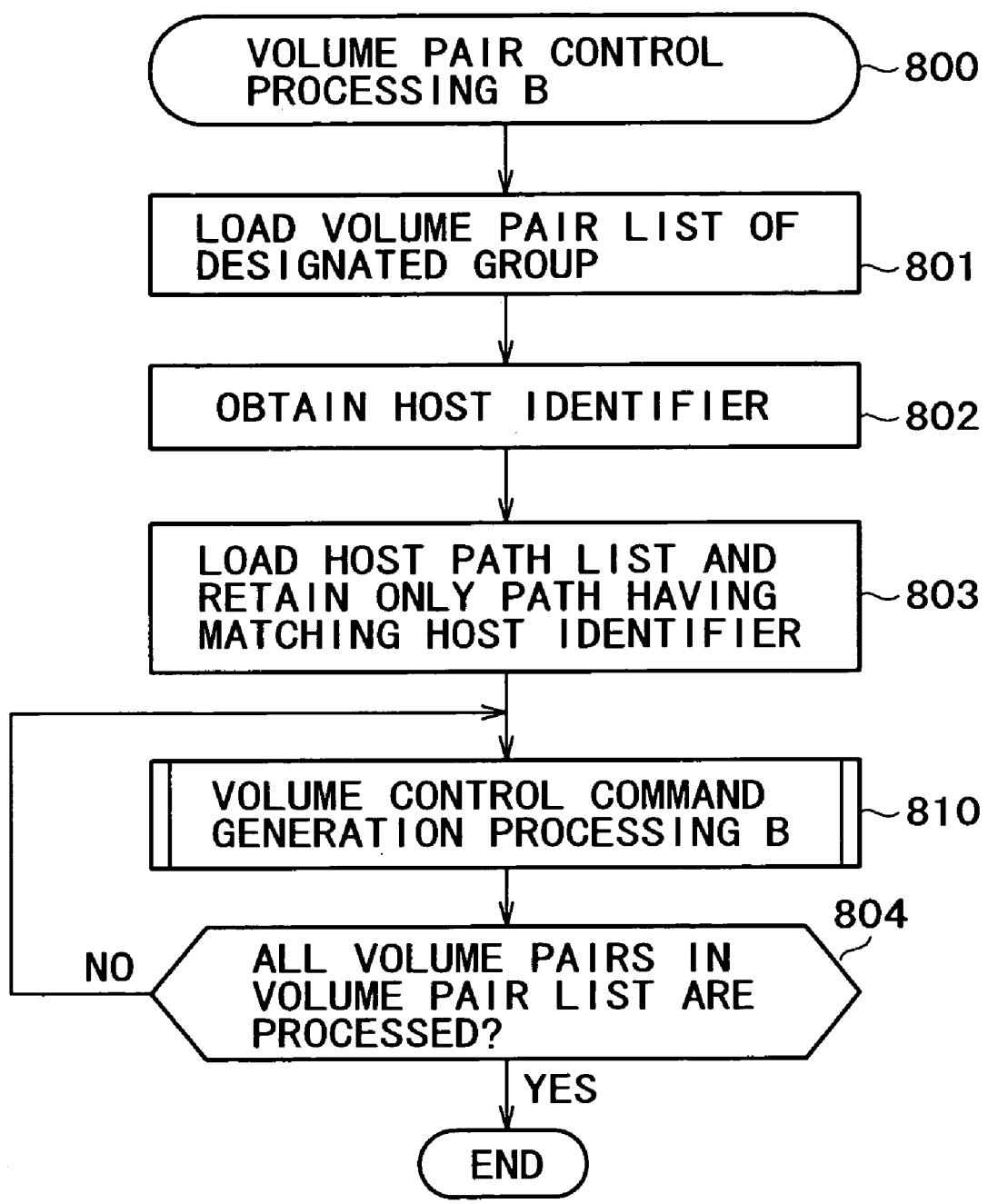
FIG. 21 is a flowchart for volume pair control processing 800 according to the third embodiment.

The script 160 includes the host command for requesting the processing to the volume pair control processing 700 (or processing 800 shown in FIG. 21). A tag "LOADPAIR ID (Pair AB)" at the first line indicates a request for loading the volume pair list 120a having the identifier Pair AB onto the main memory 102 and for recognizing the volume pair control processing 700. A gat "LOADROUTE ID (3 DC)" shown at the second line indicates a request for loading the route list 150 having an identifier 3 DC and sending, to the volume pair control processing, a notification that the host identifier is HA. In the case of obtaining an initial setting parameter of the CPUID or OS and setting the host identifier in the volume pair control processing 700, an operand "HOST(HA)" is unnecessary. A tag "ESTABLISH ID (Pair AB)." at the third line indicates a request for starting the remote copy of the volume pair in the volume pair list 120*a*.

The script 160 may include the host command other than that indicating the request for starting the remote copy. In place of describing the first line, the volume pair list 120*a* may be loaded to the main memory 102 at the timing for executing the third line. In place of describing the ID of the route list 150 in the volume pair list 120 and describing the second line, the route list 150 may be loaded at the timing for loading the volume pair list 120*a*.

Figure 13:
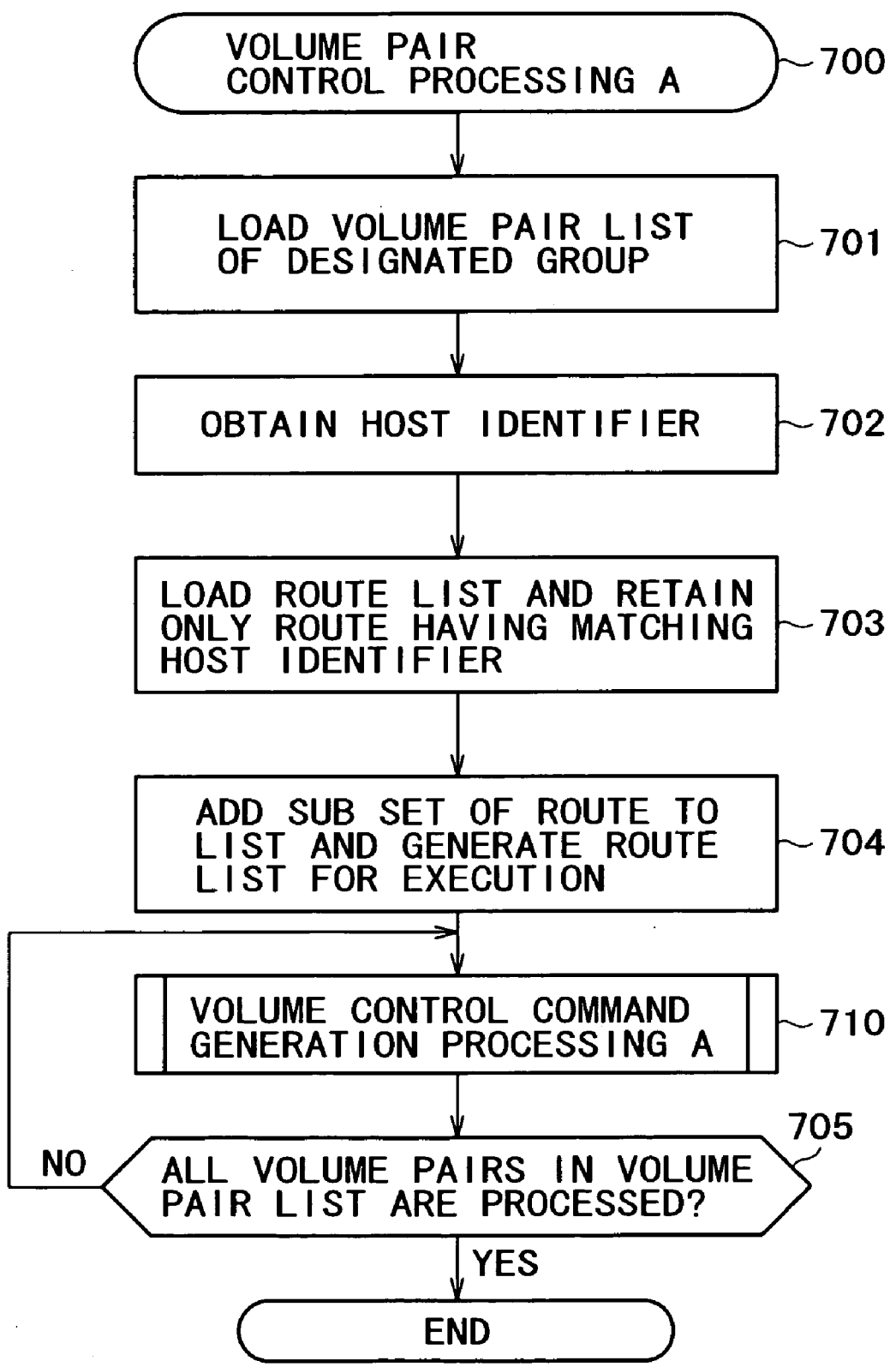
FIG. 13 is a flowchart for volume pair control processing 700 according to the first embodiment.

FIG. 13 shows a flowchart of the volume pair control processing 700 shown in FIG. 2.

The volume pair list 120 in the volume group designated to the operand of the host command is loaded to the main memory 102 from the external storage which stores them (step 701). The host identifier is obtained from the operand, CPUID, and initial setting parameter (step 702). Similarly, the route list 150 is loaded to the main memory 102, and the route including no host computer identifier obtained in step 702 is excluded (step 703). The route list 150 shown in FIG. 13 is converted into the route list 150 shown in FIG. 10 (step 704). The volume control command generation processing 710 is repeated until all the pairs in the volume pair list 120 are processed (step 705).

Figure 14:
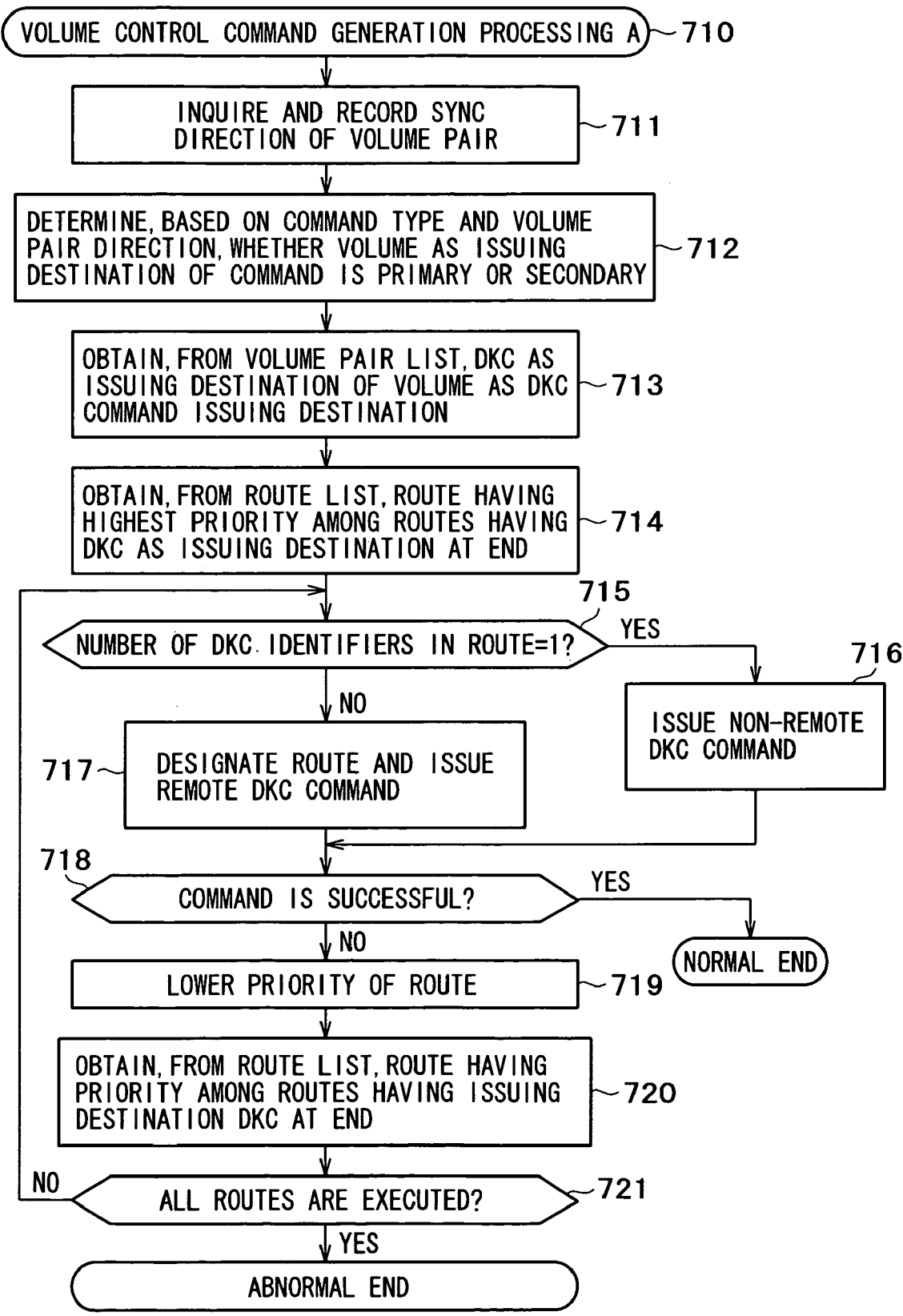
FIG. 14 is a flowchart for volume control command generation processing 710 according to the first embodiment.

FIG. 14 shows a flowchart of the volume control command generation processing 710 shown in FIG. 13.

The pair synchronizing direction, that is, copy direction between the volumes is inquired and is stored to the main memory 102 (step 711). It is determined based on the type of DKC command and the volume pair direction whether volume as the issuing destination of DKC command is primary or secondary is primary or secondary (step 712). The DKC as the issuing destination of the volume as DKC command issuing destination is obtained from the volume pair list 120 (step 713). The route having the highest priority is obtained from the route list 150 among the routes having the DKC as the issuing destination at the end (step 714). If the primary volume and secondary volume are fixed, the processing in steps 711 and 712 may not be necessary.

It is determined that the number of DKC identifiers in the route is one (step 715), a non-remote DKC command is issued (step 716). If the number of DKC identifiers is two or more, the DKC identifier on the route is added to input information on the remote DKC command (180*a* in FIG. 15A) (step 717). If the successful DKC command is answered from the DKC 110, the processing ends (step 718).

On the other hand, if an error response is transmitted from the DKC 110, the priority of the route is lowered (step 719), and the route having the second priority is obtained from the route list 150 among the routes having the issuing-destination DKC at the end (step 720).

It is checked whether or not all the routes are executed (step 721). If the executed route exists (NO in step 721), the processing routine returns to step 715 whereupon the remote DKC command is executed by another route again. When the remote DKC command is executed by all the routes, an error code is issued to the script 160. However, steps 719 to 721 are not necessarily performed. At the timing for sending the error response from the DKC 110, the error code may be returned to the host computer 100 as the issuing source.

FIGS. 15A and 15B are diagrams showing the structure of the input information on the remote DKC command.

FIG. 15A shows the remote DKC command input information 180*a* according to the first embodiment. FIG. 15B shows remote DKC command input information 180*b* according to the first embodiment.

The input information 180*a* and 180*b* include an identifier 182 of the target volume and an identifier 183 of the DKC 110 to which the target volume belongs. However, unlike the input information 180*b*, the input information 180*a* has one or a plurality of identifiers 181 of the DKC 110 on the route.

As mentioned above, according to the first embodiment, the route list 150 is generated from the volume pair list 120 and the transmittal route of the command for the volume in the volume pair list 120 is obtained from the route list 150. Therefore, the volume pair list 120 and the route list 150 can be used. Thus, the script 160 may not be overwritten if the structure is changed without needing to defining the specific structure type and to describing the route in the script 160 by the user.

One host computer 100 forms the volume pair list 120, and the volume pair list 120 and the route list 150 are transmitted to the host computer 100 which might operate them. Then, the same definition information is used on a plurality of sites or a plurality of operating form (normally, /failover/failback) and the script 160 of the remote copy can be executed without the re-definition. Without description in the script 160 at the link trouble, the command can automatically be re-inputted via another path.

The present invention is not limited to the first embodiment and can variously be modified. Hereinbelow, some examples will be described.

Figure 16:
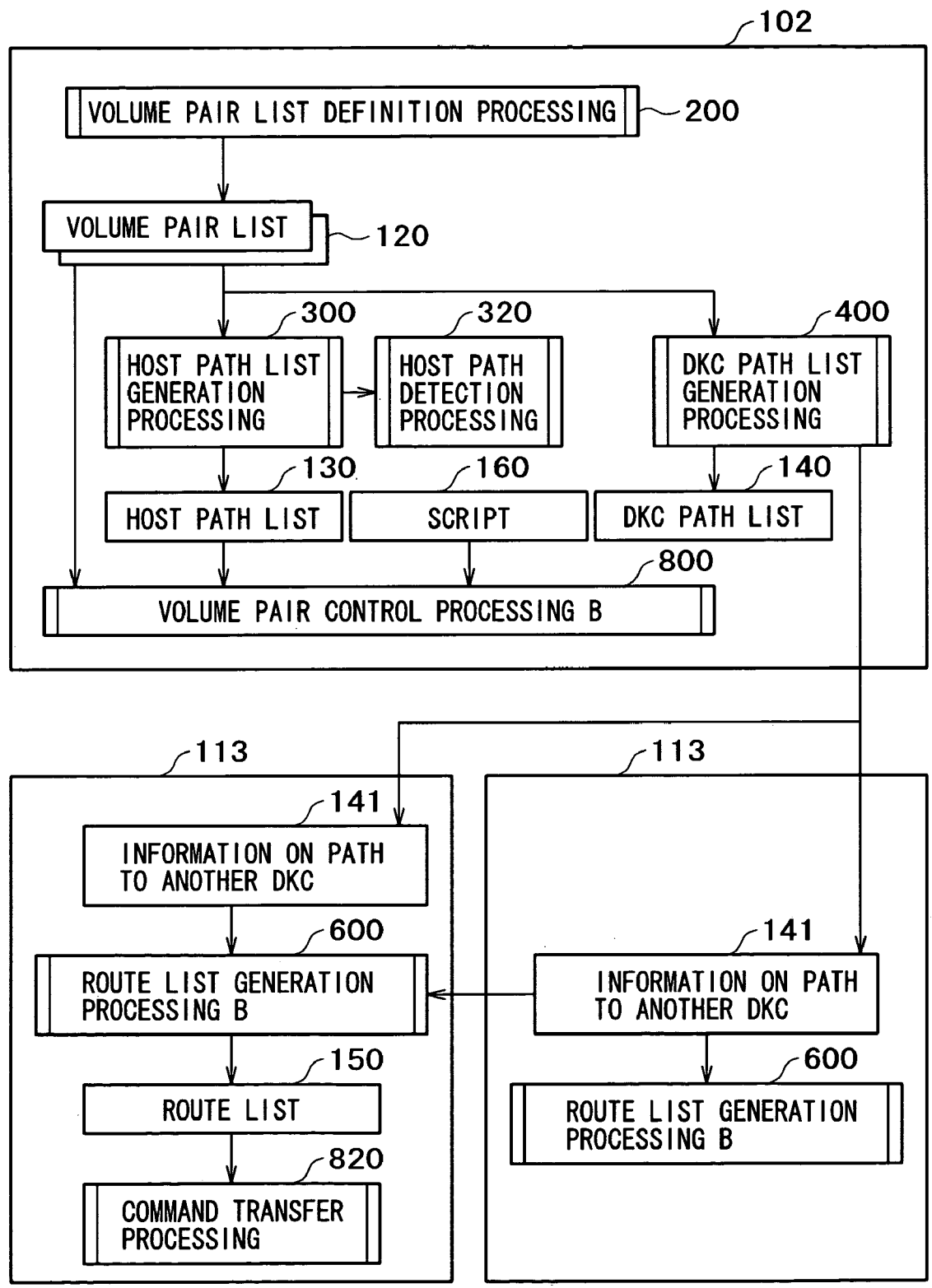
FIG. 16 is a diagram showing the entire processing functions for controlling the volume pair according to the second embodiment of the present invention.

FIG. 16 is a diagram showing the entire processing functions for controlling the volume pair according to the second embodiment.

Unlike the structure shown in FIG. 2 according to the first embodiment, the generation processing of the route list 150 is performed not by the host computer 100 but by the DKC 110. The route list 150 is stored in a shared memory 113 in the DKC 110.

That is, the main memory 102 in the host computer 100 comprises, the volume list 120, host path list 130, script 160, volume pair list definition processing 200, host path list generation processing 300, host path detection processing 320, and DKC path list generation processing 400, which are all the same as those according to the first embodiment. Further, the main memory 102 comprises volume pair control processing 800 according to the second embodiment, which is different from the volume pair control processing 700 according to the first embodiment. The shared memory 113 in all the DKCs 110 has path information 141 to another DKC 110 based on the unit of the DKC 110 or unit of the disk adapter 114. One or a plurality of DKCs 110 have the route list 150, route list generation processing 600 for generating the route list 150, and command transmittal processing 820 for transmitting the DKC command to the other DKC 110.

According to the second embodiment, the transmittal route is dynamically changed depending on the situation such as an error by determining the generation place of the route list 150 based on the volume pair list 120 and by determining the DKC 110 for transmitting the DKC command based on the route information in the route list 150.

Figure 17:
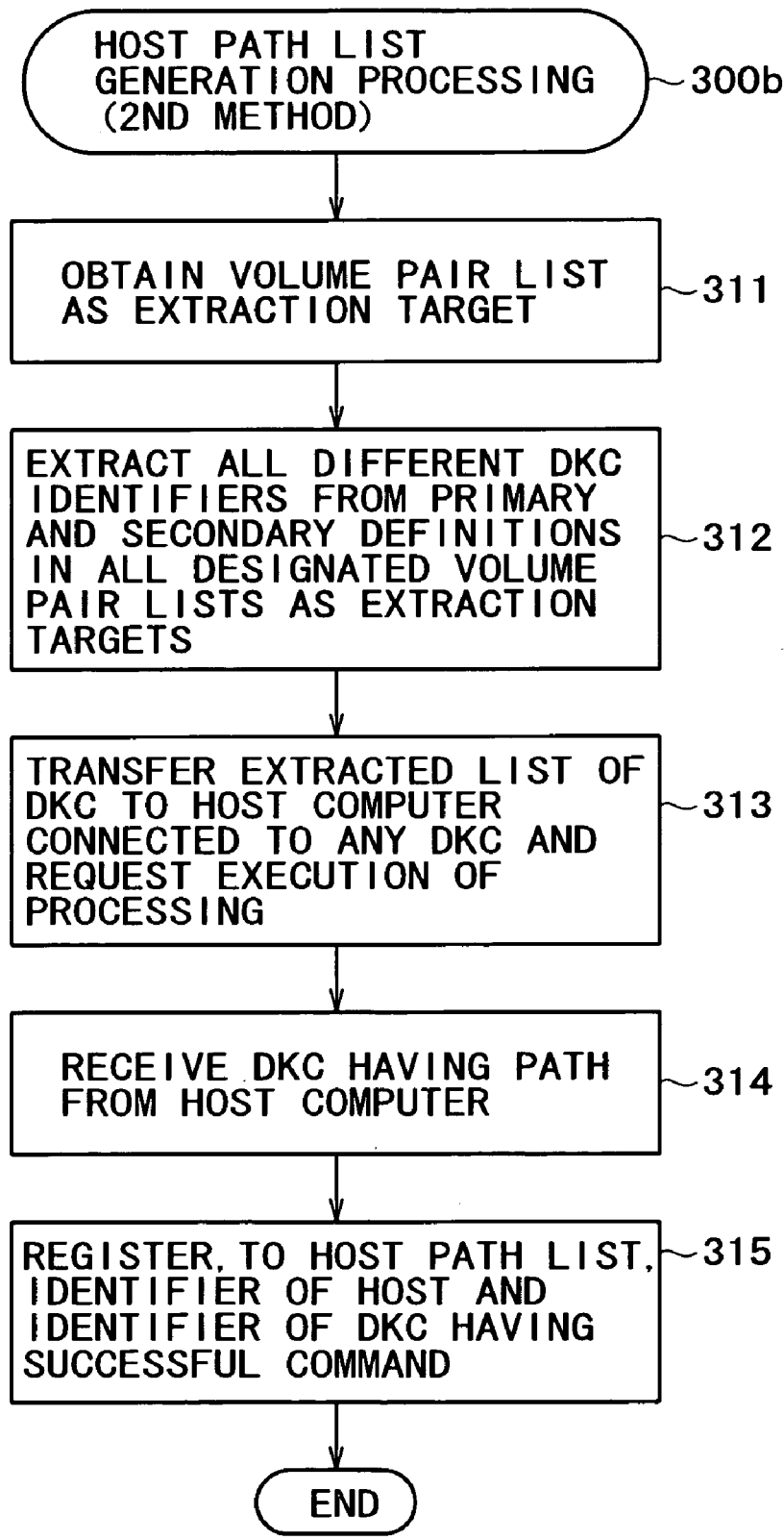
FIG. 17 is a flowchart for host path list generation processing according to the second embodiment.

FIG. 17 is a flowchart of processing 300*b* for generating the host path list 130 according to the second embodiment (second method). This method shown in FIG. 17 is an alternative method of that shown in FIG. 6.

Similarly to the first method shown in FIG. 6, the volume pair list 120 is obtained (step 311). The list of the DKCs 110 is extracted (step 312). Next, the list of the DKCs 110 is transmitted to the host computer 100 connected to any of the DKCs 110 (including the host computer 100 which executes the processing 300), and the execution of the host path detection processing 320 is requested (step 313). The list of the DKCs 110 having paths is received from the host computer 100(step 314). The host path list 130 is generated based on the received information (set of the host computer 100 and DKC 110) (step 315).

FIG. 18 shows another route list 150b as another example of the route list 150 shown in FIG. 2.

The route list 150b is a modification of the route list 150a shown in FIG. 10, and has a route with an overlapped part (e.g., DA-DB-DC and DA-DB) on which only the longest route is described. Subsequently to the host computer 100 and the priority, the identifier of the DKC 110 on the route is described in the route order.

The route list 150b is not limited to those shown in FIGS. 10 and 18 if the host identifier and the list of identifiers of the DKCs 110 via the DKCs 110 from the host computer 100 are recognized, and may include other information. For example, the route list 150 may include information on the data array on the main memory 102. The form of the route list 150b is used upon storing the route list 150b in the file, and the route list 150b may be converted into the route list 150a shown in FIG. 10 upon loading the file. Further, after converting the route list 150b into the route list 150a shown in FIG. 10, the route including the host computer 100, via which the volume pair control processing 700 is executed.

Figure 19:
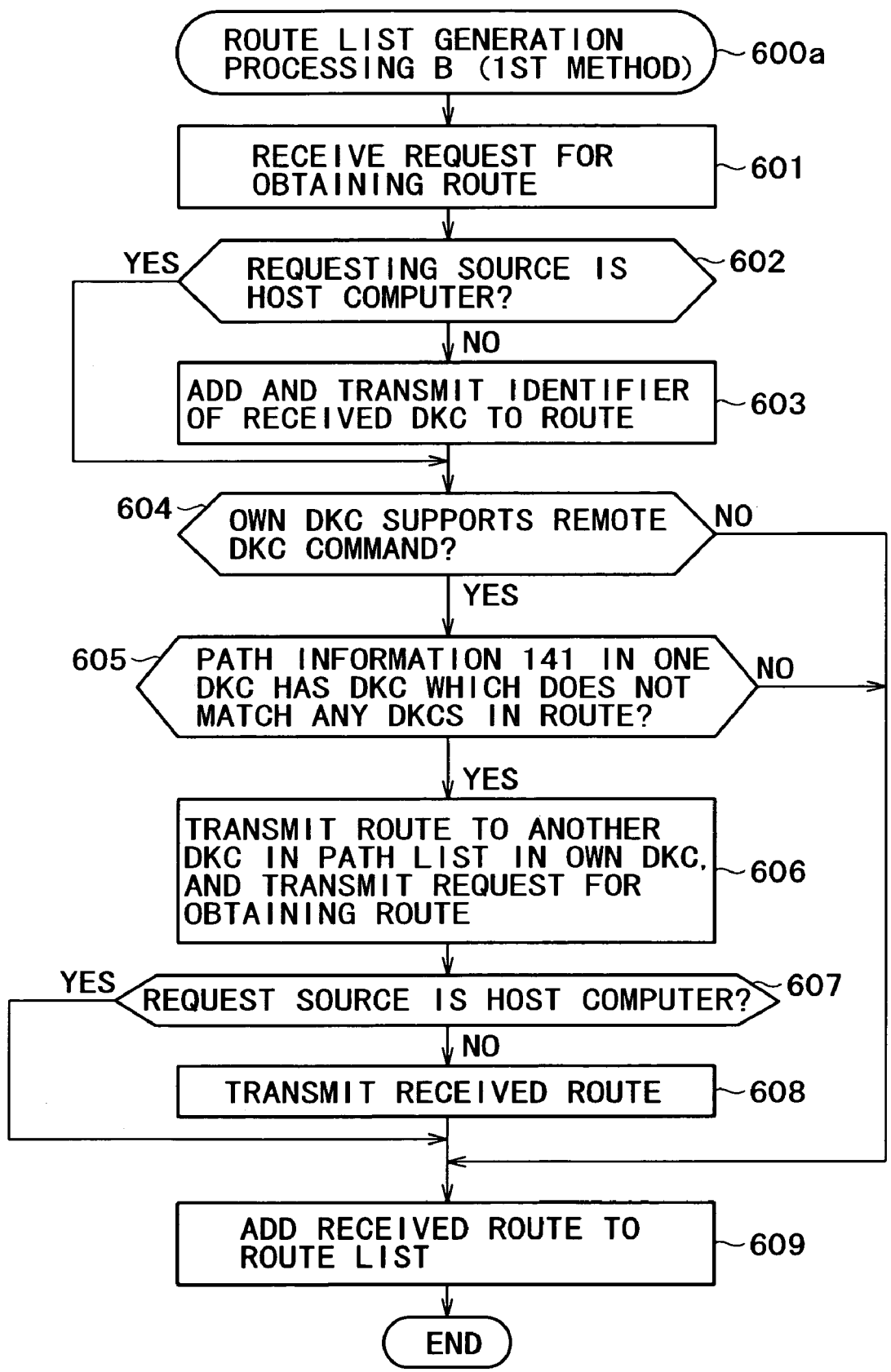
FIG. 19 is a flowchart for route list generation processing 600a according to the second embodiment.

FIG. 19 shows a flowchart of route list generation processing 600a in the route list 150 according to the second embodiment (first method).

The example of the first method shown in FIG. 19 is a modification of the first method shown in FIG. 11, and the route list 150 is generated not in the host computer 100 but in the DKC 110. As compared with the generation of the route list 150 in the host computer 100, in the case of generating the route list 150 in the DKC 110, the non-matching between the information in another hardware and the information in the host computer 100 is prevented and the processing in the host computer 100 is simplified. The route is generated by defining the path between the disk adapters 114 to the DKC 110. The route does not need to be added to the DKC command from the host computer 100 and the partner may be designated.

In the route list generation processing 600a, the processing for the DKCs 110 are the same. The DKCs 110 transmit the identifier of one DKC 110 itself to another DKC 110 based on the path information 141 in the own DKC 110, and the path information 141 transmitted from the other DKC 110 is added to the route list in the own DKC 110 to generate the list. The DKC command for requesting the route generation is issued from the host computer 100 and then the route list generation processing 600 is performed. The DKC 100 which receives the request for generating the route from the host computer 100 executes the processing in steps 601 to 609.

The route acquisition is requested to another DKC 110 described on the path information 141 in the own DKC 110 (step 601). It is determined whether or not the command requesting source is the host computer 100 (step 602) and, if NO in step 602, then the identifier of the own DKC 110 is added and transmitted to the route (step 603). It is determined whether or not the own DKC 110 supports the remote DKC command (step 604) and, if YES in step 604 and if the path information 141 in the own DKC 110 has the DKC 110 which does not match all the DKCs 110 in the route (step 605), the route is transmitted to the own DKC 110 and a request for obtaining the route is issued to the own DKC 110 (step 606).

It is determined whether or not the command request source is the host computer 100 (step 607) and, if NO in step 607, the received route is transmitted (step 608). The received route is added to the route list 150 (step 609). Similarly, the processing in steps 601 to 609 is executed for the DKC 110 which receives the request for obtaining the route from another DKC 110.

Figure 20B:
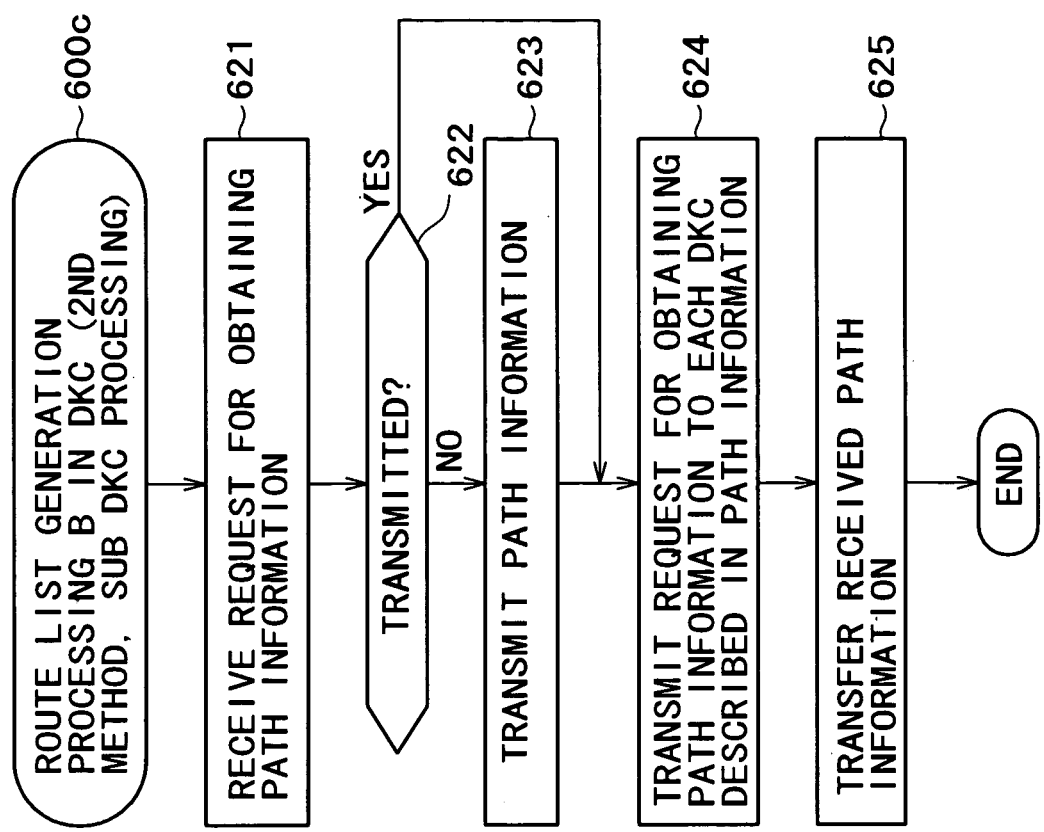
FIG. 20 is a flowchart for route list generation processing according to the third embodiment of the present invention.
Figure 20A:
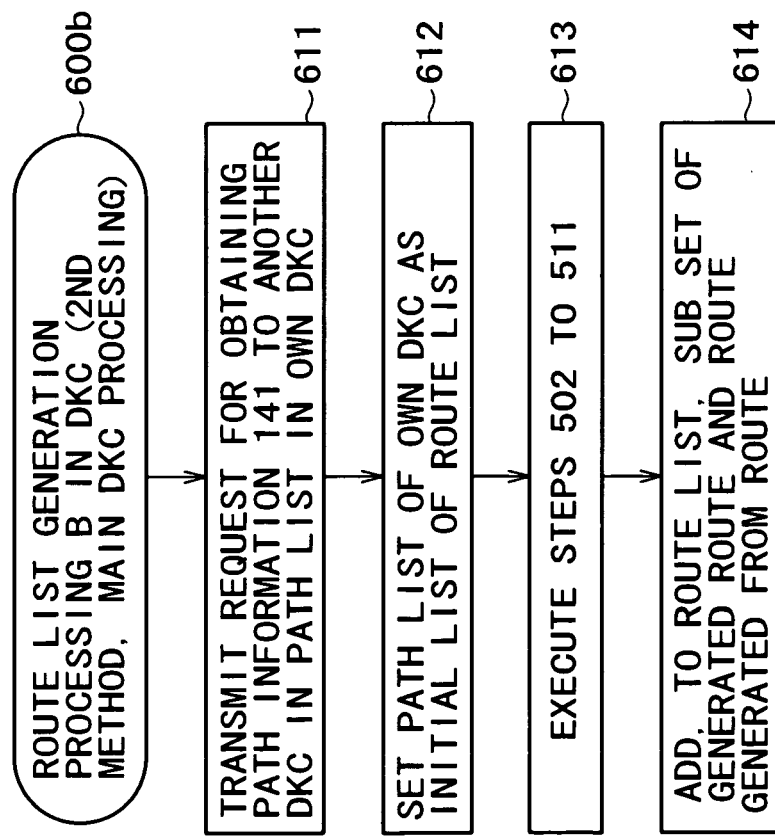

FIG. 20 is a flowchart of route list generation processing 600b of the route list 150 according to the third embodiment (second method).

In the route list generation processing 600a, the processing for the DKCs 110 is the same. However, in the route list generation processing 600b, the processing for the DKC 110 (main DKC 110) connected to the host computer 100 is different from that for the DKC 110 (sub DKC 110) which is not connected to the host computer 100. The main DKC 110 transmits here quest for obtaining the path information 141 to the sub DKC 110 and forms the route in the main DKC 110.

Own DKC 110, which receives the remote DKC command for requesting the route generation, first transmits a request for obtaining the path information 141 to another DKC 110 in the path information 141 in the own DKC 110 (step 611). The DKC 110 sets the path information 141 on the DKC 110 as an initial one of the route list 150 (step 612), and performs the processing in steps 502 to 512 shown in FIG. 11 (step 613). The own DKC 110 adds, to the route list 150, a sub-set of the generated route and the route generated from the route (step 614).

The DKC 110, which receives the request for obtaining the path information 141 from the other DKC 110, receives the request (step 621). Then, it is determined whether or not the request is transmitted (step 622) and, if NO in step 622, the own DKC 110 transmits the path information 141 (step 624), and transmits the received path information 141 (step 625).

FIG. 21 shows a flowchart of volume pair control processing 800 according to the third embodiment.

Similarly to the volume pair control processing 700, the host computer 100 loads the volume pair list 120 of the designated volume group (step 801), and obtains the host computer identifier (step 802). Similarly, the host computer 100 loads the host path list 130 (step 803), and repeats volume control command generation processing 810 until all the volume pairs in the volume pair list 120 are processed (step 804).

Figure 22:
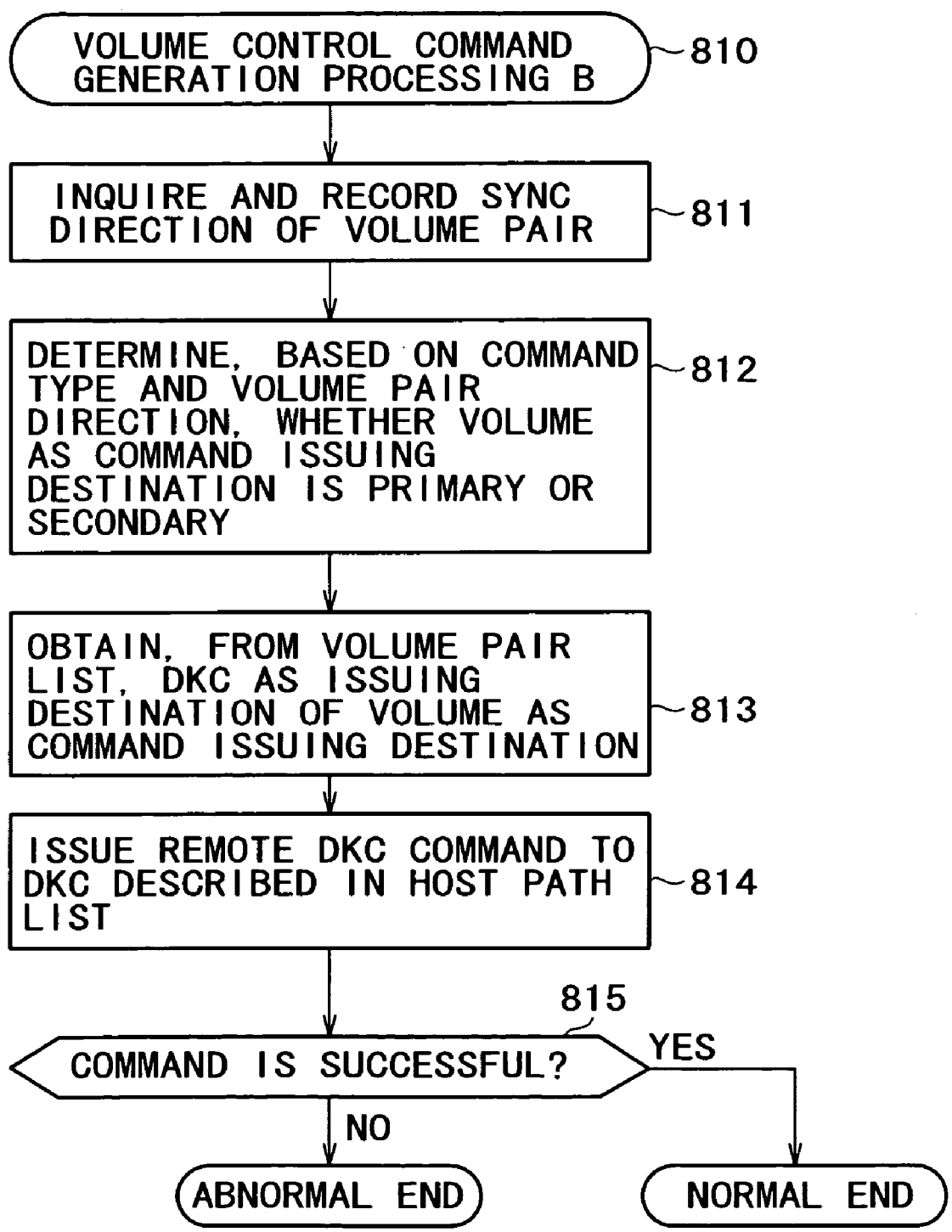
FIG. 22 is a flowchart for volume control command generation processing 810 according to the third embodiment.

FIG. 22 shows a flowchart of the volume control command generation processing 810 which is described with reference to FIG. 21 according to the third embodiment.

Similarly to the volume control command generation processing 710, the host computer 100 inquires and records the sync direction of the volume pair (step 811), and determines whether the volume pair as the issuing destination of the remote DKC command is primary or secondary (step 812). Next, the host computer 100 obtains, from the volume pair list 120, the target DKC 110 of the target volume of the remote DKC command, and describes the obtained target DKC 110 in the input information 180b of the remote DKC command (step 813). Further, the host computer 100 issues the remote DKC command to the DKC 110 described in the host path list 130 (step 814). The DKC 110, which receives the remote DKC command, executes volume control command transmittal processing 820, transmits the DKC command to the target DKC 110 in accordance with the route, and returns the execution result to the host computer 100. The received execution result is returned to the script 160 as the host command issuing source, that is, it is determined whether or not remote DKC command is successful (step 815).

Figure 23:
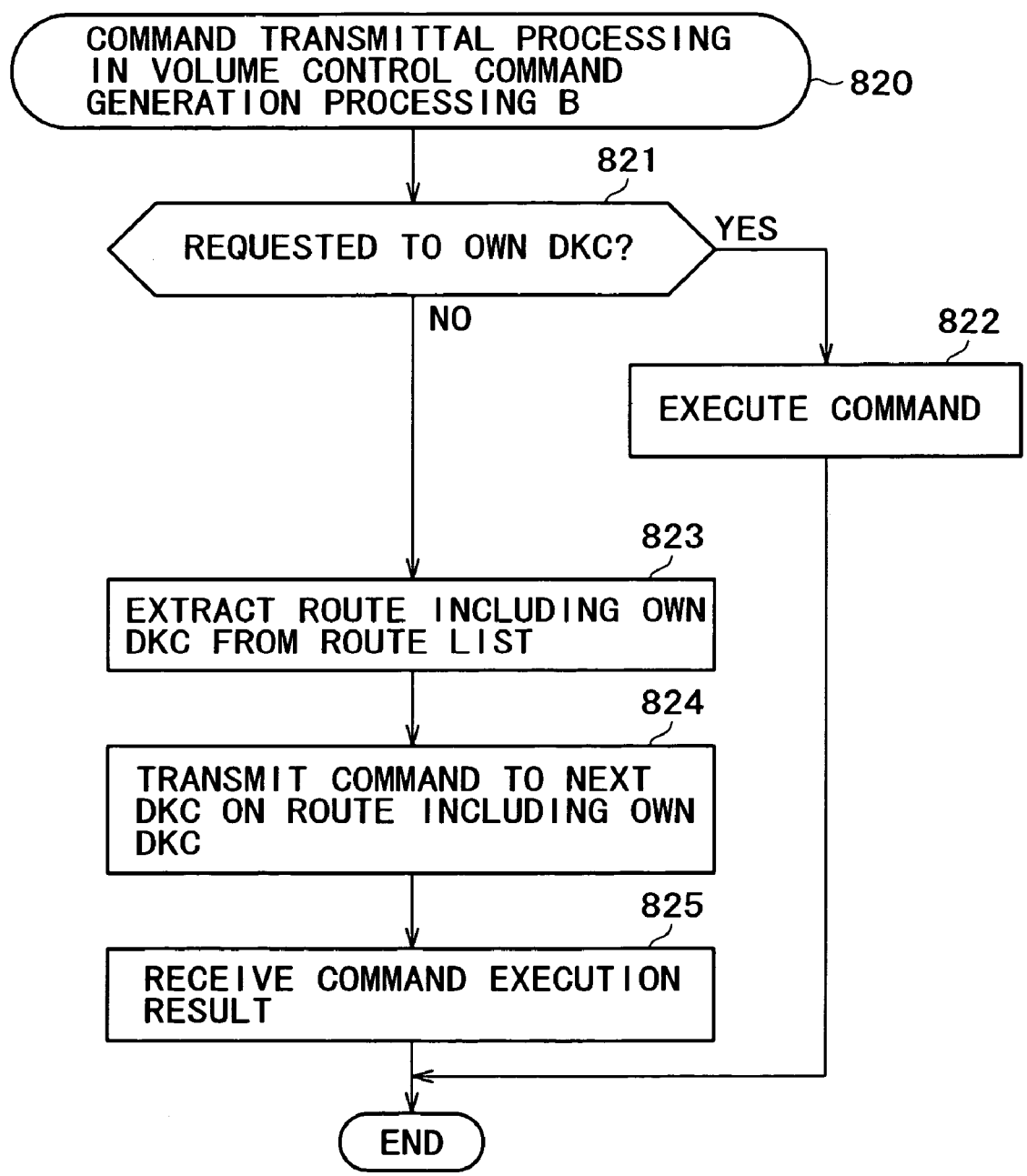
FIG. 23 is a flowchart for volume command transmittal processing 820 according to the third embodiment.

FIG. 23 shows a flowchart of the volume control command transmittal processing 820 which is described with reference to FIG. 22 according to the third embodiment.

The DKC 110, which receives the remote DKC command, determines whether or not the identifier thereof is the same as the identifier of the target DKC 110 described to the input information 180 of the remote DKC command (step 821). If it is the same, the DKC 110 executes the command and returns the result (step 822). If it is not the same, the DKC 110 refers to the route list 150 in the DKC 110 and extracts the route having the its identifier (step 823), and transmits the command to another DKC 110 next to the own DKC 110 itself on the route (step 824). Further, the DKC 110 receives the execution result of the remote DKC command from the next DKC 110 (step 825) and then ends the processing.

According to the present invention, it is possible to automatically define and control a transmitting route of a remote DKC command. As a consequence, it is possible to reduce the troublesomeness that a user describes or rewrites a host command and a script.

Having described the preferred embodiments of the invention, it should be understood that the present invention is not limited to those precise embodiments and various changes and modifications thereof could be made without departing from the spirit or scope of the invention as defined in the appended claims.

What is claimed is:

1. A remote copy control method for remotely copying a plurality of volumes located in a plurality of disk subsystems, wherein a host computer is connected to at least one of the plurality of disk subsystems, the remote copy control method comprising the steps of:

obtaining an identifier of a first disk subsystem of a first volume from a volume pair list for the host computer connected to at least one of the disk subsystems, wherein the first volume is a copy source or a copy destination of a volume pair, wherein the volume pair is a remote copy target in the disk subsystems, and wherein the volume pair list registers an identifier of the first volume and an identifier of the first disk subsystem of the first volume;

searching a route list for route information including the identifier of the first disk subsystem, wherein the route list registers an identifier of a plurality of second disk subsystems for relaying a command transmitting route for the first disk subsystem and information for determining an identifier of a third disk subsystem connected to the host computer from among the second disk subsystems;

obtaining an identifier of the third disk subsystem found in the searched route information; and issuing, to the third disk subsystem corresponding to the obtained identifier, a remote copy command of the first volume including, an input information, the identifier of the second disk subsystem and the identifier of the first disk subsystem.

2. The remote copy control method according to claim 1, further comprising the steps of:

receiving error information on the remote copy command from the third disk subsystem;

searching the route list and obtaining identifiers of a plurality of fourth disk subsystems for relaying the command transmitting route and an identifier of a fifth disk subsystem connected to the host computer from among the fourth disk subsystems, wherein the identifiers of the plurality of fourth disk subsystems for relaying and the identifier of the fifth subsystem are found in route information different from the route information having the received error information; and issuing, to the fifth disk subsystem, the remote copy command of the first volume including, in the input information, the identifier of the fourth disk subsystem and the identifier of the first disk subsystem.

3. The remote copy control method according to claim 2, further comprising the steps of:

setting priority to the route information in the route list; and degrading the priority set to the route information when the error information is received.

4. The remote copy control method according to claim 1, further comprising the steps of:

obtaining a host identifier for uniquely identifying the host computer;

adding the host identifier to the route information; and deleting, from the route list, the route information having the host identifier of the host computer that does not match the host identifier added to the route information.

5. The remote copy control method according to claim 1, further comprising the steps of:

determining a main/sub property of the first volume of the first disk subsystem;

obtaining a second volume as a pair of the first volume from the volume pair list, when the main/sub property of the first volume does not match the main/sub property required by a host command; and issuing the remote copy command to the disk subsystem of the second volume.

6. The remote copy control method according to claim 1, further comprising the steps of:

generating a volume pair list which includes the identifier of the first volume as the copy destination of the volume pair in a designated volume pair list and the identifier of the disk subsystem to which the first volume belongs; and fetching an identifier of a second volume as a pair of the first volume and an identifier of a sixth disk subsystem to which the second volume belongs.

7. The remote copy control method according to claim 1, further comprising the steps of:

extracting from the volume pair list all volume pairs having at least one different identifier of adapters, wherein the volume pair list registers the identifier of the first volume as the copy source or copy destination and further registers the identifier of an adapter, wherein the volume pair is a remote copy target in the disk subsystem, and wherein the identifier of the first volume and the identifier of the adapter are identified from identifiers included in an operand of a host command for the host computer connected to at least one of the plurality of disk subsystems; and issuing a command for forming a logical path between the adapters in an extracted volume pair.

8. A command path control method of a disk controller, wherein a command is transmitted for volumes located in a plurality of disk controllers, the method comprising the steps of:

extracting identifiers of the plurality of disk controllers from a volume pair list, wherein the volume pair list registers an identifier of a first volume as a copy source or a copy destination in a volume pair and registers an identifier of a first disk controller including the first volume, wherein the volume pair is a remote copy target in the disk controllers, wherein the identifier of the first volume and the identifier of the first disk controller are identified from an identifier of a host command for at least one host computer connected to at least one of the plurality of disk controllers;

obtaining a second disk controller for directly receiving a command from the host computer from among the plurality of different disk controllers corresponding to the extracted identifiers;

generating a disk controller path list comprising a set of the identifiers of a pair of disk controllers, wherein the set of the identifiers of a pair of disk controllers includes a disk controller pair having at least one of a first identifier and a second identifier of the disk controllers, and wherein the disk controller pair is different from a volume pair included in the volume pair list;

obtaining a set of identifiers including an identifier of a third disk controller from the disk controller path list; and generating a route list including route information including the identifier of the host computer, the identifier of the third disk controller, and an identifier of a fourth disk controller, wherein the identifier of the fourth disk controller is different from the identifier of the third disk controller in the set including the identifier of the third disk controller.

9. The command path control method according to claim 8, further comprising the steps of:

obtaining information for identifying whether or not a remote copy command is received from a third disk controller different from the second disk controller included in the set including the disk controllers; and adding, to the route list, route information including the identifier of the third disk controller only when reception is possible.

10. The command path control method according to claim 8, further comprising the steps of:

extracting the identifier of the fourth disk controller in all designated volume pair lists from a first host computer;

transmitting a list including the identifier of the fourth disk controller to all of a plurality of second host computers including the first host computer;

issuing a remote copy command to all of a plurality of fourth disk controllers and transmitting, to one of the plurality of second host computers, the identifier of the second disk controller receiving the remote copy command and an identifier of the second host computer which issues the remote copy command; and generating a host path list including the transmitted identifier of the second disk controller and the identifier of the second host computer.

11. The command path control method according to claim 8, further comprising the steps of:

obtaining identifiers of a plurality of fourth disk controllers for directly issuing a command from the host computer in a host path list, wherein the host path list includes one or more sets including a host identifier for uniquely identifying the host computers and the identifier of the fourth disk controller;

obtaining first logical path information for the fourth disk controller;

extracting an identifier of a fifth disk controller from the first logical path information;

generating route information including the identifier of the fourth disk controller and the identifier of the fifth disk controller;

obtaining second logical path information for the fifth disk controller;

extracting the identifier of the first disk controller included in the second logical path information; and adding, to the route information, the identifier of the first disk controller.

12. A method for transmitting a command to a volume in a disk controller, comprising the steps of:

extracting from a volume pair list all volume pairs having at least one different identifier of an adapter, wherein the first volume is a copy source or a copy destination, wherein the volume pair list registers one or more of the identifiers of the first volume and registers one or more of the identifiers of the adapter, and wherein each of the volume pairs is a remote copy target in the disk controller; and issuing a command for forming a logical path between two adapters included in the extracted volume pair.

13. A command transmitting method of a volume in a disk controller, comprising the steps of:

transmitting first route information including an identifier of a first disk controller to a second disk controller, wherein the second disk controller has a logical path to the first disk controller;

transmitting, to the first disk controller, second route information additionally having an identifier of the second disk controller, by the second disk controller which receives the first route information; and adding the first and second route information to a route list in the first disk controller by the first disk controller which receives the second route information.

14. A command control method of a volume in a disk subsystem, comprising the steps of:

obtaining an identifier of a first disk subsystem of a first volume, by referring to a volume pair list for registering an identifier of the first volume, wherein the first volume is a copy source or a copy destination of a volume pair, and wherein the volume pair is a remote copy target in the disk subsystem;

obtaining an identifier of a second disk subsystem connected to a host computer, from a host path list for registering the identifier of the second disk subsystem;

issuing, to the second disk subsystem, a remote copy command of the first volume including the identifier of the first disk subsystem as input information; and if the identifier of the first disk subsystem does not match an identifier of a third disk subsystem which receives the remote copy command, obtaining route information including the identifier of the first disk subsystem from a route list for registering route information including an identifier of a fourth disk subsystem which can transmit the remote copy command from the third disk subsystem, and transmitting the remote copy command to the fourth disk subsystem indicated by the route information.

15. A command path control method of a disk controller, comprising the steps of:
receiving a remote copy command with a transmittal function;
holding, from a first disk controller, route information including an identifier of a second disk controller which can transmit the remote copy command;
determining an identifier of the first disk controller and an identifier of a third disk controller, wherein the third disk controller includes a volume as a transmittal destination of the remote copy command;
obtaining, from the route information, the identifier of the third disk controller that includes the volume as the transmittal destination of the remote copy command;
transmitting the remote copy command to the second disk controller indicated by the route information; and
transmitting, via the second disk controller, the remote copy command to the third disk controller that includes the volume as the transmittal destination of the remote copy command.

16. A disk subsystem having a plurality of disk subsystems having volumes for storing data used for a host computer, for processing a command transmitted from the host computer and for remotely copying the volumes by connecting the disk subsystems, the disk subsystem comprising:
a memory for storing a volume pair list and a route list, the volume pair list for holding an identifier of a first volume as a copy source or a copy destination of remote copy and an identifier of a first disk subsystem of the first volume, and the route list for holding route information including information for determining an identifier of the host computer, the identifier of the first disk subsystem, an identifier of a second disk subsystem for relaying a transmitting route of the command to the first disk subsystem from the host computer, or an identifier of a third disk subsystem connected to the host computer among the second disk subsystems;
means for obtaining the identifier of the first disk subsystem including the first volume by referring to the volume pair list;
means for searching the route information including the first disk subsystem by referring to the route list and for obtaining the identifier of the third disk subsystem included in the route information; and
means for requesting the remote copy of the first volume in the first disk subsystem to the third disk subsystem relating to the obtained identifier.

17. The disk system according to claim 16, wherein the host computer has the memory and a processing unit, and the memory further stores a program for obtaining the identifiers, and
wherein the host computer executes the program by the processing unit.

18. The disk system according to claim 16, wherein the volume pair list is stored in the memory included in the host computer, the route list is stored in at least the memory included in the first disk subsystem, and
wherein the second disk subsystem has means for receiving a command for requesting the remote copy and for transmitting the received command to the third disk subsystem.

19. A remote copy control method for remotely copying a volume by connecting a plurality of disk subsystems having volumes for storing data used by a host computer, the remote copy control method comprising the steps of:
loading, to a main memory, a volume pair list for registering an identifier of a first volume as a copy source or a copy destination of remote copy and for registering an identifier of a first disk subsystem of the first volume;
loading, to the main memory, a route list for holding route information including information for determining an identifier of the host computer, the identifier of the first disk subsystem, an identifier of a second disk subsystem for relaying a transmitting route of a command to the first disk subsystem from the host computer, and an identifier of a third disk subsystem connected to the host computer;
obtaining the identifier of the first disk subsystem including the first volume by referring to the volume pair list;
searching route information including the first disk subsystem by referring to the route list and obtaining the identifier of the third disk subsystem included in the route information; and
issuing a command for remotely copying the first volume in the first disk subsystem to the third disk subsystem relating to the obtained identifier.

20. A remote copy command transmittal method for transmitting a command for remote copy of a volume by connecting a plurality of disk controllers having volumes for storing data processed by a host computer, the remote copy command transmittal method comprising the steps of:
preparing, in a memory, a volume pair list including an identifier of a first volume as a copy source or a copy destination of a volume pair and an identifier of a first disk controller including the first volume,
wherein the identifier of the first volume and the identifier of the first disk controller are identified based on an identifier of a host command to the host computer, which is connected to at least one disk controller, and
wherein the volume pair is a remote copy target in the disk controllers;
extracting identifiers of the plurality of disk controllers from the volume pair list and obtaining an identifier of a second disk controller for directly issuing a command from the host computer from among the extracted identifiers of the plurality of disk controllers;
preparing, in the memory, a disk controller path list comprising a set of the identifiers of a pair of disk controllers,
wherein the set of the identifiers of a pair of disk controllers includes a disk controller pair having at least one of a first identifier and a second identifier of the disk controllers, and
wherein the disk controller pair is different from a volume pair included in the volume pair list;
obtaining a set of identifiers including the identifier of the second disk controller from the disk controller path list; and
preparing, in the memory, a route list including route information including the identifier of the host computer, the identifier of the second disk controller, and an identifier of a third disk controller different from the identifier of the second disk controller included in the set including the identifier of the second disk controller;
searching route information including the first disk controller by referring to the route list and obtaining an identifier of a fourth disk controller as the copy destination included in the route information; and
transmitting a remote copy command of the first volume in the first disk controller to the fourth disk controller relating to the obtained identifier.

* * * * *